United States Patent
Kumar et al.

(10) Patent No.: US 10,520,922 B2
(45) Date of Patent: Dec. 31, 2019

(54) DECENTRALIZED SUPPLY CHAIN FOR THREE-DIMENSIONAL PRINTING BASED ON DISTRIBUTED LEDGER TECHNOLOGY

(71) Applicant: ACCENTURE GLOBAL SOLUTIONS LIMITED, Dublin (IE)

(72) Inventors: Pravesh Kumar, Delhi (IN); Harshit Nigam, Lucknow (IN); Prashant Sanghvi, Gurgaon (IN); Ashutosh Vikram, Gurgaon (IN); Anshul Gupta, Delhi (IN); Varun Joshi, New Delhi (IN); Anurag Kataria, Jodhpur (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 110 days.

(21) Appl. No.: 15/917,500

(22) Filed: Mar. 9, 2018

(65) Prior Publication Data

US 2019/0278254 A1  Sep. 12, 2019

(51) Int. Cl.
*B33Y 50/00* (2015.01)
*G05B 19/4099* (2006.01)
(Continued)

(52) U.S. Cl.
CPC .......... *G05B 19/4099* (2013.01); *B33Y 50/02* (2014.12); *G06Q 30/0283* (2013.01);
(Continued)

(58) Field of Classification Search
None
See application file for complete search history.

(56) References Cited

U.S. PATENT DOCUMENTS

2015/0205544 A1* 7/2015 Webb ............... H04N 1/32539
                                                    358/1.15
2016/0209819 A1* 7/2016 Cudak .................. G05B 15/02
(Continued)

OTHER PUBLICATIONS

Trouton, S et al., "3D opportunity for blockchain: Additive manufacturing links the digital thread", Deloitte University Press, 2016, pp. 1-17.

*Primary Examiner* — Paul B Yanchus, III
(74) *Attorney, Agent, or Firm* — Mannava & Kang, P.C.

(57) ABSTRACT

According to an example, with respect to decentralized supply chain for three-dimensional printing based on distributed ledger technology, three-dimensional printing constraints may be ascertained for a three-dimensional part to be printed, and a plurality of attributes for three-dimensional printers may be ascertained. The three-dimensional printing constraints may be compared to each attribute of the plurality of attributes. A determination may be made as to whether the three-dimensional part is printable by at least one three-dimensional printer or not printable by any three-dimensional printer. Costs associated with three-dimensional printing of the three-dimensional part and non-three-dimensional printing based manufacturing of the three-dimensional part may be ascertained. A determination may be made as to whether the three-dimensional part is to be printed by the at least one three-dimensional printer. A distributed electronic ledger may control execution of the electronic three-dimensional printing file for the three-dimensional part, and control printing of the three-dimensional part.

20 Claims, 34 Drawing Sheets

(51) Int. Cl.
*B33Y 50/02* (2015.01)
*G06Q 30/02* (2012.01)
(52) U.S. Cl.
CPC .............. *G05B 2219/35134* (2013.01); *G05B 2219/49007* (2013.01)

(56) References Cited

U.S. PATENT DOCUMENTS

| | | |
|---|---|---|
| 2017/0279783 A1 | 9/2017 | Milazzo et al. |
| 2018/0012311 A1 | 1/2018 | Small et al. |
| 2018/0173203 A1* | 6/2018 | Freer ..................... G06F 21/62 |

* cited by examiner

Add new project

Name

Description

Create

FIG. 3

Add new project

Name: R&D Transformation project

Description: For Design and Rapid Prototyping

Create

*FIG. 4*

Initialize

How do you want to add data?

● Single entry

● Multiple entries

Create Part

Part id

Part name

Component name

Save & Continue

FIG. 6

Create Part

Part id: 8745

Part name: Engine

Component name: Compressor

Save & Continue

FIG. 7

Enter Material Properties

| Min tensile strength (MPa) | |
| Min tensile elongation (%) | |
| Min tensile modulus (MPa) | |
| Min flexural strength (MPa) | |
| Min flexural modulus (MPa) | |
| Coeff Of thermal expansion (mm/°C) | |
| Specific weight | |
| Hardness | |
| Min heat deflection temp (0.45MPa) | |
| IZOD impact strength (J/m) | |
| Min softening temperature (°C) | |
| Min material thickness (mm) | |

Create

*FIG. 9*

Part Detail

Min height (mm) _____

Max height (mm) _____

Min width (mm) _____

Max width (mm) _____

Min length (mm) _____

Max length (mm) _____

Min layer height (mm) _____

QA level (1-5) _____

[Save]

[ADD More Parts] [Run Analysis]

*FIG. 11*

Analysis Result

Export to Excel

| | | |
|---|---|---|
| Total Parts | 1 | Details |
| Print Ready Parts | 1 | Details |
| Parts Not Printable | 0 | Details |
| Material Constraint | 0 | Details |
| Design Constraint | 0 | Details |

Save and continue

*FIG. 12*

Print Ready Parts

| Part Id | Printer name | Printer manufactures |
|---|---|---|
| 8745 | 3DP Workbench | 3D Platform |
| 8745 | BigRep ONE | BigRep |
| 8745 | BigRep Studio | BigRep |
| 8745 | BeeRed | be3D |
| 8745 | Replicator Mini+ | Makerbot |
| 8745 | Replicator Z18 | Makerbot |
| 8745 | Replicator+ | Makerbot |
| 8745 | Ultimaker 2 Extended+ | Ultimaker |
| 8745 | Ultimaker 2 Go | Ultimaker |
| 8745 | Ultimaker 2+ | Ultimaker |
| 8745 | Ultimaker Original | Ultimaker |
| 8745 | Ultimaker Original+ | Ultimaker |
| 8745 | UP Plus 2 | Beijing TierTime |
| 8745 | Vision | Xery |

*FIG. 13*

Add new project

Name

Description

Create

FIG. 15

Add new project

Name: R&D Transformation project

Description: For Design and Rapid Prototyping

Create

FIG. 16

Questionnaire

Part Id

Material type

Parts made of same material (#)

Total parts (#)

Weight (kgs)

Material cost per kg ($)

Energy cost per hour ($)

Labour wage rate per hour ($)

Part design cost ($)

Production timeline (Months)

Save & Continue

*FIG. 18*

Injection Molding Questionnaire

Mold machining cost ($)

Mold material cost ($)

Mold design and overhead cost ($)

Machine hourly rate ($)

Usage (kgs)

Cycle time (sec)

Machine efficiency (%)

Cavities (#)

Capital cost ($)

Obsolescene cost ($)

Expediting cost ($)

Logistics cost ($)

Other costs ($)

Save & Continue

FIG. 19

3DP Details

Technology
Printing time (Hours)

FDM
PJ
SLA
SLS

Post processing (Hours)

Logistics costs ($)

Other costs ($)

Training cost ($)

Run Analysis

```
┌─────────────────────────────────────────────────────────┐
│ ASCERTAIN, FROM AN ELECTRONIC STEREOLITHOGRAPHY FILE FOR│
│ A THREE-DIMENSIONAL PART TO BE PRINTED, THREE-DIMENSIONAL│
│ PRINTING CONSTRAINTS THAT INCLUDE A DESIGN CONSTRAINT, A│
│ MATERIAL CONSTRAINT, AND A DIMENSION CONSTRAINT         │
│                         2402                            │
└─────────────────────────────────────────────────────────┘
                            ↓
┌─────────────────────────────────────────────────────────┐
│ ASCERTAIN A PLURALITY OF ATTRIBUTES FOR EACH THREE-     │
│ DIMENSIONAL PRINTER OF A PLURALITY OF THREE-DIMENSIONAL │
│                        PRINTERS                         │
│                         2404                            │
└─────────────────────────────────────────────────────────┘
                            ↓
┌─────────────────────────────────────────────────────────┐
│ COMPARE THE THREE-DIMENSIONAL PRINTING CONSTRAINTS FROM │
│ THE ELECTRONIC STEREOLITHOGRAPHY FILE FOR THE THREE-    │
│ DIMENSIONAL PART TO BE PRINTED TO EACH ATTRIBUTE OF THE │
│ PLURALITY OF ATTRIBUTES FOR EACH THREE-DIMENSIONAL PRINTER│
│ OF THE PLURALITY OF THREE-DIMENSIONAL PRINTERS          │
│                         2406                            │
└─────────────────────────────────────────────────────────┘
                            ↓
┌─────────────────────────────────────────────────────────┐
│ DETERMINE, BASED ON THE COMPARISON, WHETHER THE THREE-  │
│ DIMENSIONAL PART IS PRINTABLE BY AT LEAST ONE THREE-    │
│ DIMENSIONAL PRINTER OF THE PLURALITY OF THREE-DIMENSIONAL│
│ PRINTERS OR NOT PRINTABLE BY ANY THREE-DIMENSIONAL PRINTER│
│ OF THE PLURALITY OF THREE-DIMENSIONAL PRINTERS          │
│                         2408                            │
└─────────────────────────────────────────────────────────┘
                            ↓
┌─────────────────────────────────────────────────────────┐
│ ASCERTAIN, BASED ON A DETERMINATION THAT THE THREE-     │
│ DIMENSIONAL PART IS PRINTABLE BY THE AT LEAST ONE THREE-│
│ DIMENSIONAL PRINTER OF THE PLURALITY OF THREE-DIMENSIONAL│
│ PRINTERS, COSTS ASSOCIATED WITH THREE-DIMENSIONAL PRINTING│
│ OF THE THREE-DIMENSIONAL PART AND NON-THREE-DIMENSIONAL │
│ PRINTING OF THE THREE-DIMENSIONAL PART                  │
│                         2410                            │
└─────────────────────────────────────────────────────────┘
                            ↓
                          ( A )
```

DETERMINE, BASED ON AN ANALYSIS OF THE COSTS ASSOCIATED WITH THE THREE-DIMENSIONAL PRINTING OF THE THREE-DIMENSIONAL PART AND THE NON-THREE-DIMENSIONAL PRINTING OF THE THREE-DIMENSIONAL PART, WHETHER THE THREE-DIMENSIONAL PART IS TO BE PRINTED BY THE AT LEAST ONE THREE-DIMENSIONAL PRINTER OF THE PLURALITY OF THREE-DIMENSIONAL PRINTERS
2412

ASCERTAIN, BASED ON A DETERMINATION THAT THE THREE-DIMENSIONAL PART IS TO BE PRINTED BY THE AT LEAST ONE THREE-DIMENSIONAL PRINTER OF THE PLURALITY OF THREE-DIMENSIONAL PRINTERS, THE ELECTRONIC STEREOLITHOGRAPHY FILE FOR THE THREE-DIMENSIONAL PART TO BE PRINTED
2414

CONTROL, BY A BLOCKCHAIN NETWORK, EXECUTION OF THE ELECTRONIC STEREOLITHOGRAPHY FILE FOR THE THREE-DIMENSIONAL PART TO BE PRINTED
2416

CONTROL, BY THE BLOCKCHAIN NETWORK AND BASED ON THE EXECUTION OF THE ELECTRONIC STEREOLITHOGRAPHY FILE FOR THE THREE-DIMENSIONAL PART TO BE PRINTED, PRINTING OF THE THREE-DIMENSIONAL PART
2418

*FIG. 24*
*(CONT.)*

DECENTRALIZED SUPPLY CHAIN FOR THREE-DIMENSIONAL PRINTING BASED ON DISTRIBUTED LEDGER TECHNOLOGY

BACKGROUND

In the area of manufacturing, a manufacturer may produce a part, such as a three-dimensional part. The three-dimensional part may be a sub-component of a larger assembly, or may otherwise include a plurality of sub-components. The three-dimensional part may be produced by a three-dimensional printer that may be used to add successive layers of material to produce the three-dimensional part, and the production process may also be referred to as Additive Manufacturing technology. For example, the three-dimensional printer may join or otherwise solidify the material under computer control to create the three-dimensional part.

BRIEF DESCRIPTION OF DRAWINGS

Features of the present disclosure are illustrated by way of examples shown in the following figures. In the following figures, like numerals indicate like elements, in which

FIG. 3 illustrates a user interface display for adding a new project to illustrate operation of a printability analyzer of the decentralized supply chain for three-dimensional printing based on distributed ledger technology system of FIG. 1, according to an example of the present disclosure;

FIG. 4 illustrates a user interface display for adding a new project designated "R&D Transformation project" to illustrate operation of the printability analyzer of the decentralized supply chain for three-dimensional printing based on distributed ledger technology system of FIG. 1, according to an example of the present disclosure;

FIG. 5 illustrates a user interface display for adding data to illustrate operation of the printability analyzer of the decentralized supply chain for three-dimensional printing based on distributed ledger technology system of FIG. 1, according to an example of the present disclosure;

FIG. 6 illustrates a user interface display for creation of a part to illustrate operation of the printability analyzer of the decentralized supply chain for three-dimensional printing based on distributed ledger technology system of FIG. 1, according to an example of the present disclosure;

FIG. 7 illustrates a user interface display for creation of a part including a part identification "8745" to illustrate operation of the printability analyzer of the decentralized supply chain for three-dimensional printing based on distributed ledger technology system of FIG. 1, according to an example of the present disclosure;

FIG. 9 illustrates a user interface display for entry of material constraints for a new part to illustrate operation of the printability analyzer of the decentralized supply chain for three-dimensional printing based on distributed ledger technology system of FIG. 1, according to an example of the present disclosure;

FIG. 11 illustrates a user interface display for entry of part dimension details for a new part to illustrate operation of the printability analyzer of the decentralized supply chain for three-dimensional printing based on distributed ledger technology system of FIG. 1, according to an example of the present disclosure;

FIG. 12 illustrates a user interface display for analysis results to illustrate operation of the printability analyzer of the decentralized supply chain for three-dimensional printing based on distributed ledger technology system of FIG. 1, according to an example of the present disclosure;

FIG. 13 illustrates a user interface display for available three-dimensional printers to illustrate operation of the printability analyzer of the decentralized supply chain for three-dimensional printing based on distributed ledger technology system of FIG. 1, according to an example of the present disclosure;

FIG. 15 illustrates a user interface display for adding a new project to illustrate operation of the print evaluator of the decentralized supply chain for three-dimensional printing based on distributed ledger technology system of FIG. 1, according to an example of the present disclosure;

FIG. 16 illustrates a user interface display for adding a new project designated "R&D Transformation project" to illustrate operation of the print evaluator of the decentralized supply chain for three-dimensional printing based on distributed ledger technology system of FIG. 1, according to an example of the present disclosure;

FIG. 18 illustrates a user interface display for part manufacturing information related with traditional manufacturing or non-three-dimensional printing to illustrate operation of the print evaluator of the decentralized supply chain for three-dimensional printing based on distributed ledger technology system of FIG. 1, according to an example of the present disclosure;

FIG. 19 illustrates a user interface display for non-three-dimensional printing based manufacturing costs for non-three-dimensional printing based manufacturing to illustrate operation of the print evaluator of the decentralized supply chain for three-dimensional printing based on distributed ledger technology system of FIG. 1, according to an example of the present disclosure;

FIG. 20 illustrates a user interface display for three-dimensional printing costs for three-dimensional printing to illustrate operation of the print evaluator of the decentralized supply chain for three-dimensional printing based on distributed ledger technology system of FIG. 1, according to an example of the present disclosure;

FIG. 24 illustrates a flowchart of a method for implementing a decentralized supply chain for three-dimensional printing based on distributed ledger technology, according to an example of the present disclosure.

DETAILED DESCRIPTION

Figure 1:
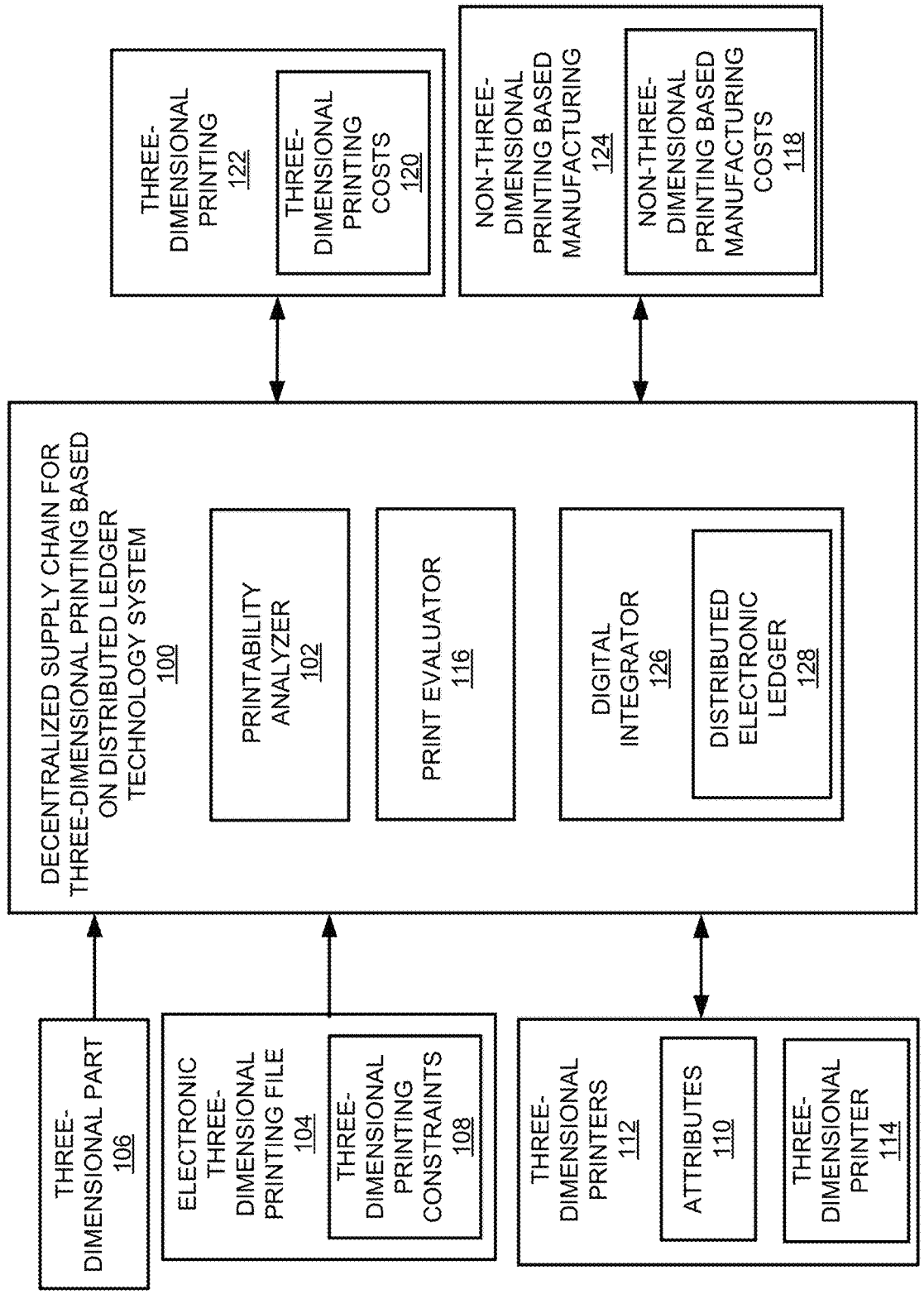
FIG. 1 illustrates an architecture of a decentralized supply chain for three-dimensional printing based on distributed ledger technology system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Decentralized supply chain for three-dimensional printing based on distributed ledger technology systems, methods for implementing a decentralized supply chain for three-dimensional printing based on distributed ledger technology, and non-transitory computer readable media having stored thereon machine readable instructions for decentralized supply chain for three-dimensional printing based on distributed ledger technology are disclosed herein. The systems, methods, and non-transitory computer readable media disclosed herein provide a supply chain for digital inventory of electronic three-dimensional printing files, such as stereolithography files, G-Codes, etc., that may be used in three-dimensional printing with distributed ledger technology. The electronic three-dimensional printing files may be creations and intellectual property assets that are transacted with multiple members throughout a supply chain. In this regard, management of the electronic three-dimensional printing files as digital inventory by transacting permission for access rights on a permissioned or private distributed ledger framework enables the complete control and visibility of the supply chain of such files. The systems, methods, and non-transitory computer readable media disclosed herein may provide for the management of multiple transactions of ownership, secure delivery and usage of electronic three-dimensional printing files, access based control to the electronic three-dimensional printing files, and visibility across a supply chain for stakeholders. Further, the systems, methods, and non-transitory computer readable media disclosed herein may provide for the management of time-stamped transaction and electronic three-dimensional printing file usage data, and automated execution of funds transfer for different payment cycles and entities. These aspects may be implemented by the systems, methods, and non-transitory computer readable media disclosed herein in a framework without the need for a third party or central authority. The systems, methods, and non-transitory computer readable media disclosed herein provide a platform for manufacturing from digital inventory with trust and traceability among corporations and other entities barring any geographical boundaries.

With respect to electronic three-dimensional printing files, the systems, methods, and non-transitory computer readable media disclosed herein provide a digital inventory management system for such files. In this regard, given the rapid technical advancement in the field of three-dimensional printing, the portfolio of printable parts continues to grow. For the systems, methods, and non-transitory computer readable media disclosed herein, parts that may be printable using a three-dimensional printer may be identified by a printability analyzer as disclosed herein. A print evaluator may analyze costs of materials, cost of operations and printers, which may translate to a higher number of three-dimensional parts where there is a potential for savings. Further, a digital integrator may be built over a blockchain network, which may operate as a distributed electronic ledger to provide for tracking and tracing of a print job and associated electronic three-dimensional printing files. In this regard, the digital integrator and the distributed electronic ledger may provide a complete inventory management solution for three-dimensional printed parts. The decentralized ledger technology may provide for properties such as traceability, immutability of transaction data, provenance of electronic three-dimensional printing files, and security of electronic three-dimensional printing files. The digital inventory management provided by the systems, methods, and non-transitory computer readable media disclosed herein may also provide for augmentation of manufacturing, logistics, and warehousing management.

With respect to technical challenges associated with management of electronic three-dimensional printing files, in the area of manufacturing, it is technically challenging to manage the manufacture of parts that may utilize electronic three-dimensional printing files, such as stereolithography files, G-Codes, etc. For example, it is technically challenging to ascertain an electronic three-dimensional printing file to avoid delays with respect to manufacture of a three-dimensional part. For parts that may be manufactured by the hundreds or thousands, it is technically challenging to manage, for example, from a remote location, use of electronic three-dimensional printing files to ensure that the files are authorized for use. In this regard, once an electronic three-dimensional printing file is being used, it is technically challenging to manage, for example, from a remote location, use of the electronic three-dimensional printing file to ensure that an associated three-dimensional part is being manufactured according to the specifications of the electronic three-dimensional printing file. It is also technically challenging to determine whether a three-dimensional part may be manufactured by a three-dimensional printing technique, and whether the part should be manufactured by a three-dimensional printing technique. It is also technically challenging to determine the misuse of a three-dimensional part. It is also technically challenging to segregate from hundred thousand of part data into printable and non-printable parts. It is also technically challenging to operate multiple hardware devices in one platform as different three-dimensional printers may use different software. It is also technically challenging to determine when the three-dimensional parts are printed and ready for collection. It is also technically challenging to provide a single dashboard of multiple three-dimensional printers located at various locations on real-time basis. Yet further, it is also technically challenging to ascertain live printing of three-dimensional parts from a remote location.

In order to address at least the aforementioned technical challenges with respect to manufacture of three-dimensional parts, and management of electronic three-dimensional printing files, the systems, methods, and non-transitory computer readable media disclosed herein provide a printability analyzer to ascertain, from an electronic three-dimensional printing file for a three-dimensional part to be printed, three-dimensional printing constraints that include a design constraint, a material constraint, and a dimension constraint. The printability analyzer may ascertain a plurality of attributes for each three-dimensional printer of a plurality of three-dimensional printers that may be used to manufacture the three-dimensional part. The printability analyzer may compare the three-dimensional printing constraints from the electronic three-dimensional printing file for the three-dimensional part to be printed to each attribute of the plurality of attributes for each three-dimensional printer of the plurality of three-dimensional printers. For example, the plurality of attributes may include a design attribute, a material attribute, and a dimension attribute associated with each of the three-dimensional printers. The printability analyzer may determine, based on the comparison, whether the three-dimensional part is printable by at least one three-dimensional printer of the plurality of three-dimensional printers or not printable by any three-dimensional printer of the plurality of three-dimensional printers. A print evaluator may ascertain, based on a determination that the three-dimensional part is printable by the at least one three-dimensional printer of the plurality of three-dimensional printers, costs (e.g., non-three-dimensional printing based manufacturing costs and three-dimensional printing costs) associated with three-dimensional printing of the three-dimensional part and non-three-dimensional printing based manufacturing of the three-dimensional part. The print evaluator may determine, based on an analysis of the costs associated with the three-dimensional printing of the three-dimensional part and the non-three-dimensional printing based manufacturing of the three-dimensional part, whether the three-dimensional part to be printed by the at least one three-dimensional printer of the plurality of three-dimensional printers is economically cheaper than the part produced by non-three dimensional printing. A digital integrator may ascertain, based on a determination that the three-dimensional part is to be printed by the at least one three-dimensional printer of the plurality of three-dimensional printers, the electronic three-dimensional printing file for the three-dimensional part to be printed. The digital integrator may control, by a distributed electronic ledger, execution of the electronic three-dimensional printing file for the three-dimensional part to be printed. The digital integrator may control, by the distributed electronic ledger and based on the execution of the electronic three-dimensional printing file for the three-dimensional part to be printed, printing of the three-dimensional part. In this regard, misuse of a three-dimensional part may be prevented by transferring the associated file over a secured distributed ledger system as disclosed herein.

The printability analyzer may thus analyze hundreds or thousands of three-dimensional parts in a single analysis. The printability analyzer may provide intelligent printer selection by comparing specification of hundreds or thousands of three-dimensional printers. The printability analyzer may determine a most appropriate material selection by analyzing detail material properties for a three-dimensional part. The printability analyzer may generate an output that includes multiple three-dimensional parts that may be categorized into printable and non-printable parts on the basis of material, dimension, and design parameters. The printability analyzer may provide three-dimensional printer suggestions for printable parts. Further, the printability analyzer may provide material recommendation for non-printable parts in the event such parts are not printable due to material constraints.

The print evaluator may thus evaluate a plurality of cost factors to compare printing of the three-dimensional part using three-dimensional printing and non-three-dimensional printing based manufacturing. The print evaluator may also implement a volumetric analysis to provide a cost for a three-dimensional part using three-dimensional printing and non-three-dimensional printing at different volume points.

In some examples, elements of the decentralized supply chain for three-dimensional printing based on distributed ledger technology system may be machine readable instructions stored on a non-transitory computer readable medium. In this regard, the decentralized supply chain for three-dimensional printing based on distributed ledger technology system may include or be a non-transitory computer readable medium. In some examples, the elements of the decentralized supply chain for three-dimensional printing based on distributed ledger technology system may be hardware or a combination of machine readable instructions and hardware.

FIG. 1 illustrates an architecture of a decentralized supply chain for three-dimensional printing based on distributed ledger technology system 100 (hereinafter "system 100"), according to an example of the present disclosure.

Referring to FIG. 1, the system 100 may include a printability analyzer 102 that is executed by at least one hardware processor (e.g., the hardware processor 2302 of FIG. 23, and/or the hardware processor 2504 of FIG. 25) to ascertain, from an electronic three-dimensional printing file 104 for a three-dimensional part 106 to be printed, three-dimensional printing constraints 108 that include a design constraint, a material constraint, and a dimension constraint. In this regard, although the examples disclosed herein are with respect to a three-dimensional part 106, the techniques disclosed herein may be utilized for parts of any dimensions (e.g., two-dimensional, etc.).

According to examples disclosed herein, the electronic three-dimensional printing file 104 may include a stereolithography (STL) file.

The printability analyzer 102 may ascertain a plurality of attributes 110 for each three-dimensional printer of a plurality of three-dimensional printers 112.

The printability analyzer 102 may compare the three-dimensional printing constraints 108 from the electronic three-dimensional printing file 104 for the three-dimensional part 106 to be printed to each attribute of the plurality of attributes 110 for each three-dimensional printer of the plurality of three-dimensional printers 112.

According to examples disclosed herein, the printability analyzer 102 may ascertain the plurality of attributes 110 that include a design attribute, a material attribute, and a dimension attribute. Further, the printability analyzer 102 may compare the three-dimensional printing constraints 108 from the electronic three-dimensional printing file 104 for the three-dimensional part 106 to be printed to each attribute of the plurality of attributes 110 for each three-dimensional printer of the plurality of three-dimensional printers 112 by comparing the design attribute to the design constraint, comparing the material attribute to the material constraint, and comparing the dimension attribute to the dimension constraint. In this regard, the printability analyzer 102 may identify design challenges as specified by the comparison of the design attribute to the design constraint, the material attribute to the material constraint, and the dimension attribute to the dimension constraint.

The printability analyzer 102 may determine, based on the comparison, whether the three-dimensional part 106 is printable by at least one three-dimensional printer 114 of the plurality of three-dimensional printers 112 or not printable by any three-dimensional printer of the plurality of three-dimensional printers 112.

According to examples disclosed herein, the printability analyzer 102 may determine, based on the comparison, whether the three-dimensional part 106 is printable by the at least one three-dimensional printer 114 of the plurality of three-dimensional printers 112 or not printable by any three-dimensional printer of the plurality of three-dimensional printers 112 by determining whether the design attribute meets or exceeds the design constraint, determining whether the material attribute meets or exceeds the material constraint, and determining whether the dimension attribute meets or exceeds the dimension constraint.

According to examples disclosed herein, based on a determination that the three-dimensional part 106 is not printable by any three-dimensional printer of the plurality of three-dimensional printers 112, the printability analyzer 102 may determine whether the design constraint or the material constraint of the three-dimensional part 106 to be printed is not respectively met by a design attribute or a material attribute of any three-dimensional printer of the plurality of three-dimensional printers 112. Further, based on a determination that the design constraint of the three-dimensional part 106 to be printed is not met by the design attribute of any three-dimensional printer of the plurality of three-dimensional printers 112, the printability analyzer 102 may specify a redesign for the three-dimensional part 106 to be printed to meet the design attribute of at least one three-dimensional printer 114 of the plurality of three-dimensional printers 112. Further, based on a determination that the material constraint of the three-dimensional part 106 to be printed is not met by the material attribute of any three-dimensional printer of the plurality of three-dimensional printers 112, the printability analyzer 102 may specify an alternate material for the three-dimensional part 106 to be printed to meet the material attribute of at least one three-dimensional printer of the plurality of three-dimensional printers 112.

A print evaluator 116 that is executed by at least one hardware processor (e.g., the hardware processor 2302 of FIG. 23, and/or the hardware processor 2504 of FIG. 25) may ascertain, based on a determination that the three-dimensional part 106 is printable by the at least one three-dimensional printer 114 of the plurality of three-dimensional printers 112, costs (e.g., non-three-dimensional printing based manufacturing costs 118 and three-dimensional printing costs 120) associated with three-dimensional printing 122 of the three-dimensional part 106 and non-three-dimensional printing based manufacturing 124 of the three-dimensional part 106.

The print evaluator 116 may determine, based on an analysis of the costs associated with the three-dimensional printing 122 of the three-dimensional part 106 and the non-three-dimensional printing based manufacturing 124 of the three-dimensional part 106, whether the three-dimensional part 106 is to be printed by the at least one three-dimensional printer 114 of the plurality of three-dimensional printers 112.

According to examples disclosed herein, the print evaluator 116 may determine, based on the analysis of the costs associated with three-dimensional printing 122 of the three-dimensional part 106 and the non-three-dimensional printing based manufacturing 124 of the three-dimensional part 106, whether the three-dimensional part 106 is to be printed by the at least one three-dimensional printer 114 of the plurality of three-dimensional printers 112 by determining whether a cost associated with three-dimensional printing 122 of the three-dimensional part 106 is lower than a cost associated with the non-three-dimensional printing based manufacturing 124 of the three-dimensional part 106. Further, based on a determination that the cost associated with three-dimensional printing 122 of the three-dimensional part 106 is lower than the cost associated with the non-three-dimensional printing based manufacturing 124 of the three-dimensional part 106, the print evaluator 116 may determine that the three-dimensional part 106 is to be printed by the at least one three-dimensional printer 114 of the plurality of three-dimensional printers 112.

A digital integrator 126 that is executed by at least one hardware processor (e.g., the hardware processor 2302 of FIG. 23, and/or the hardware processor 2504 of FIG. 25) may ascertain, based on a determination that the three-dimensional part 106 is to be printed by the at least one three-dimensional printer 114 of the plurality of three-dimensional printers 112, the electronic three-dimensional printing file 104 for the three-dimensional part 106 to be printed.

The digital integrator 126 may control, by a distributed electronic ledger 128, execution of the electronic three-dimensional printing file 104 for the three-dimensional part 106 to be printed.

According to examples disclosed herein, the distributed electronic ledger 128 may include a blockchain network.

The digital integrator 126 may control, by the distributed electronic ledger 128 and based on the execution of the electronic three-dimensional printing file 104 for the three-dimensional part 106 to be printed, printing of the three-dimensional part 106.

According to examples disclosed herein, the digital integrator 126 may control, by the distributed electronic ledger 128, execution of the electronic three-dimensional printing file 104 for the three-dimensional part 106 to be printed by ascertaining an authorization to execute the electronic three-dimensional printing file 104 for the three-dimensional part 106 to be printed. The digital integrator 126 may determine, based on the ascertained authorization, whether an entity associated with the at least one three-dimensional printer 114 of the plurality of three-dimensional printers 112 is authorized to execute the electronic three-dimensional printing file 104 for the three-dimensional part 106 to be printed. Further, based on a determination that the entity associated with the at least one three-dimensional printer 114 of the plurality of three-dimensional printers 112 is authorized to execute the electronic three-dimensional printing file 104 for the three-dimensional part 106 to be printed, the digital integrator 126 may cause the electronic three-dimensional printing file 104 to be executed to print the three-dimensional part 106.

According to examples disclosed herein, the digital integrator 126 may control, by the distributed electronic ledger 128, execution of the electronic three-dimensional printing file 104 for the three-dimensional part 106 to be printed by ascertaining a material that is available for printing of the three-dimensional part 106. The digital integrator 126 may determine, based on the ascertained material that is available for printing of the three-dimensional part 106, whether an entity associated with the at least one three-dimensional printer 114 of the plurality of three-dimensional printers 112 has access to the material that is available for printing of the three-dimensional part 106. Further, based on a determination that the entity associated with the at least one three-dimensional printer 114 of the plurality of three-dimensional printers 112 has access to the material that is available for printing of the three-dimensional part 106, the digital integrator 126 may cause the electronic three-dimensional printing file 104 to be executed to print the three-dimensional part 106.

According to examples disclosed herein, the digital integrator 126 may control, by the distributed electronic ledger 128 and based on the execution of the electronic three-dimensional printing file 104 for the three-dimensional part 106 to be printed, payment to an owner of the electronic three-dimensional printing file 104 by the digital integrator 126 by determining, by the distributed electronic ledger 128, that the electronic three-dimensional printing file 104 has been executed. Further, based on a determination, by the distributed electronic ledger 128, that the electronic three-dimensional printing file 104 has been executed, the digital integrator 126 may cause, by the distributed electronic ledger 128, transfer of the payment to the owner of the electronic three-dimensional printing file 104.

According to examples disclosed herein, the digital integrator 126 may control, by the distributed electronic ledger 128 and based on the printing of the three-dimensional part 106, transfer of the three-dimensional part to a user by determining, by the distributed electronic ledger 128, that the three-dimensional part 106 has been printed. Further, based on a determination, by the distributed electronic ledger 128, that the three-dimensional part 106 has been printed, the digital integrator 126 may cause, by the distributed electronic ledger 128, transfer of the three-dimensional part 106 to the user.

Figure 2:
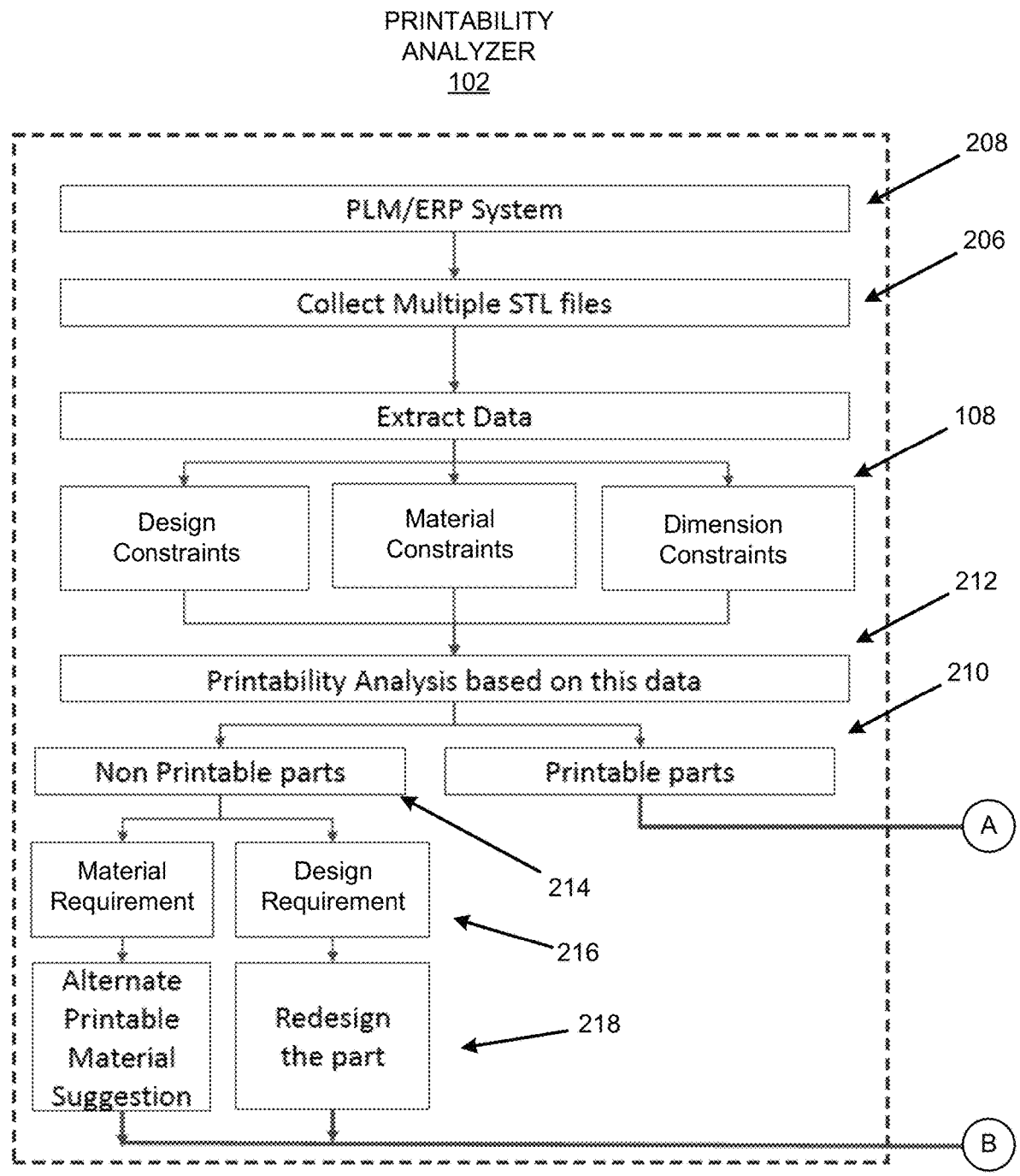
FIG. 2 illustrates further details of the architecture of the decentralized supply chain for three-dimensional printing based on distributed ledger technology system of FIG. 1, according to an example of the present disclosure.
Figure 2:
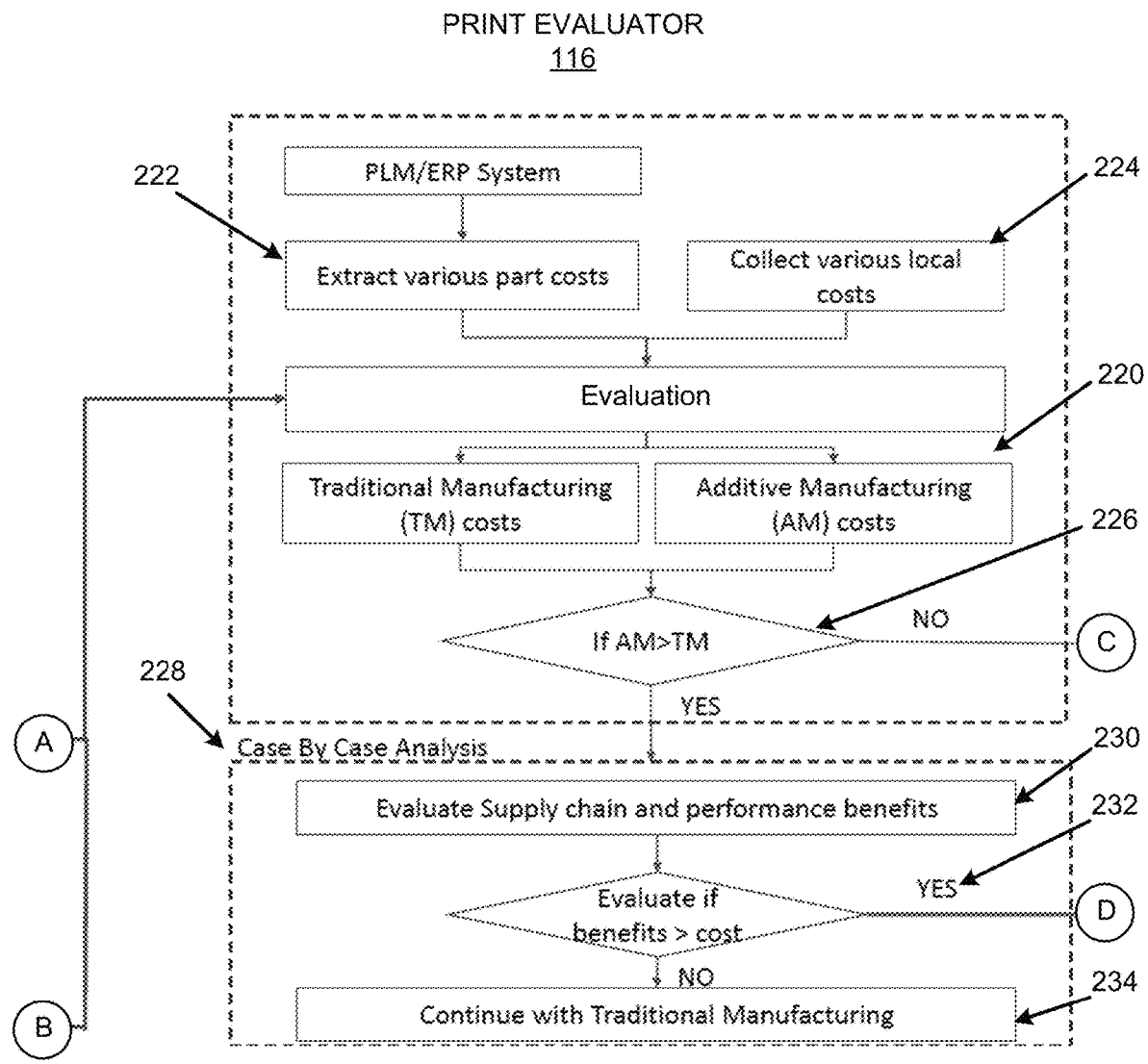
Figure 2:
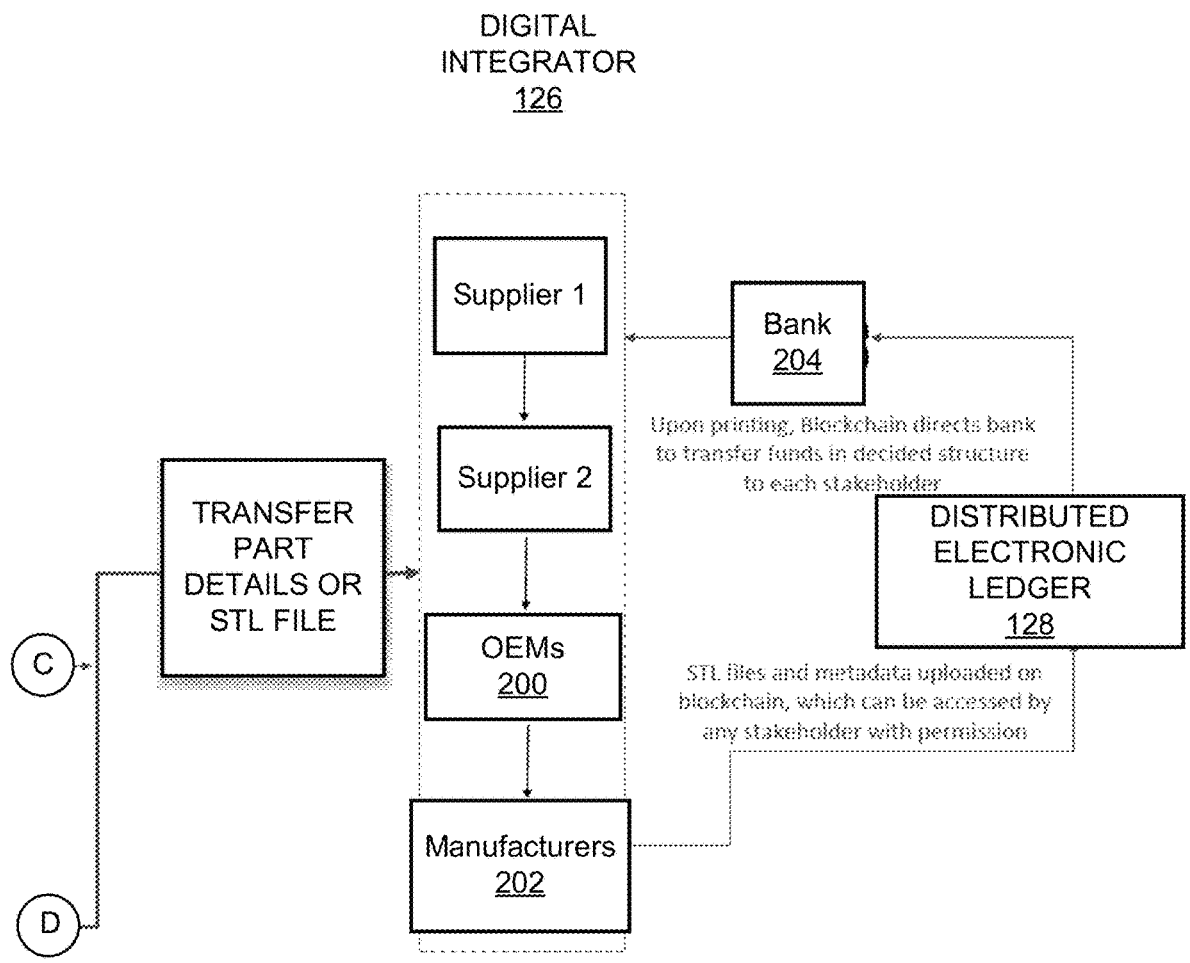
Figure 2:
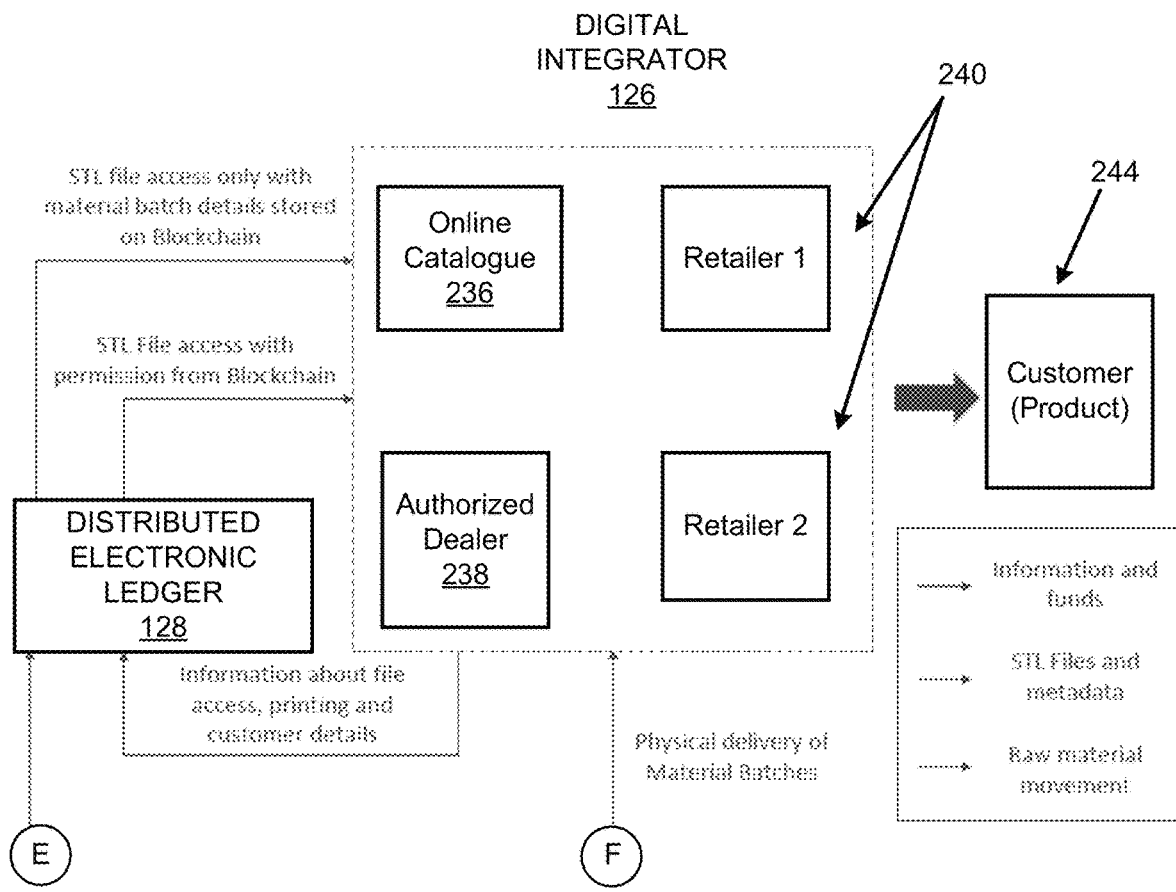
Figure 2:
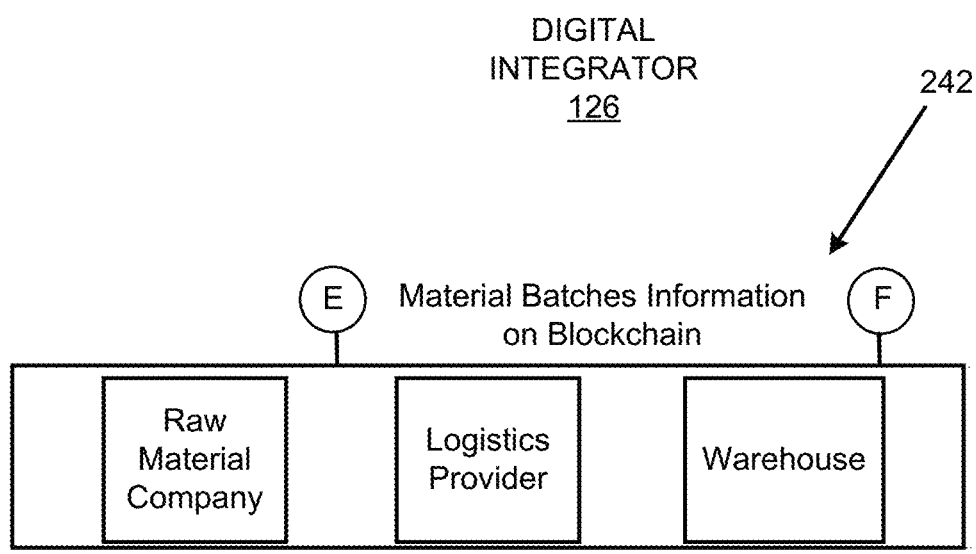

FIG. 2 illustrates further details of the architecture of the system 100, according to an example of the present disclosure.

Referring to FIGS. 1 and 2, a three-dimensional part 106 may include hundreds or thousands of components that may need to be maintained in an inventory management system. The system 100 may provide for such inventory management with respect to management of electronic three-dimensional printing files for three-dimensional parts to be printed.

The electronic three-dimensional printing files may generally include stereolithography (STL) files, and other such files. An STL file may be described as a file format used for stereolithography computer aided design (CAD) software.

With respect to the printability analyzer 102 and the print evaluator 116, a determination as to whether a three-dimensional part may be printed by a three-dimensional printer and a determination of whether a three-dimensional part should be printed by a three-dimensional printer may be respectively made with or without electronic three-dimensional printing files. In this regard, the determination by the printability analyzer 102 and the print evaluator 116 may be made with part information such as design constraints, material constraints, dimension constraints, etc., or by using an available electronic three-dimensional printing file. In this regard, instead of entering the three-dimensional printing constraints 108, the electronic three-dimensional printing file 104 for the three-dimensional part may be uploaded into the printability analyzer 102. The electronic three-dimensional printing file 104 may also include part information for a plurality of other parts, in addition to the three-dimensional part 106 that is to be printed.

With respect to the digital integrator 126, if an electronic three-dimensional printing file 104 is available from the printability analyzer 102 and/or the print evaluator 116, the electronic three-dimensional printing file 104 may be transferred to the digital integrator 126. If an electronic three-dimensional printing file 104 is not available from the printability analyzer 102 and/or the print evaluator 116, the electronic three-dimensional printing file 104 may be received, for example, from sources such as suppliers (e.g., the Supplier-1 and/or the Supplier-2 of FIG. 2), original equipment manufacturers 200, manufacturers 202, etc. For example, the original equipment manufacturers 200 may include a company designated XYZ corporation that provides for three-dimensional printing of thousands of parts. In this regard, the XYZ corporation may provide electronic three-dimensional printing files for such parts to be utilized by the digital integrator 126 as disclosed herein. That is, the electronic three-dimensional printing files may be made available to the distributed electronic ledger 128. Assuming that the three-dimensional part 106 to be printed corresponds to an electronic three-dimensional printing file 104 provided by the XYZ corporation, the electronic three-dimensional printing file 104 may thus be utilized by the digital integrator 126 to print the three-dimensional part 106 as disclosed herein. Once the three-dimensional part 106 has been printed, as shown in FIG. 2, the XYZ corporation may be paid by a bank 204 or otherwise remitted for usage for the electronic three-dimensional printing file 104. In the event an electronic three-dimensional printing file 104 is not available, a three-dimensional part may be scanned, for example, by the digital integrator 126 to create an electronic three-dimensional printing file 104.

With respect to the printability analyzer 102, referring to FIGS. 1 and 2, and particularly to FIG. 2, according to an example, an automobile company, or another such company, may include hundreds of thousands of three-dimensional parts that are manufactured and subsequently assembled. A three-dimensional part may be analyzed to determine whether the three-dimensional part is printable or not printable as disclosed herein. That is, a three-dimensional part may be analyzed and categorized as printable or not printable as disclosed herein. The design, material, and dimension constraints with respect to a three-dimensional part may be entered manually (e.g., as disclosed herein with respect to FIGS. 9-11. Additionally or alternatively, an electronic three-dimensional printing file 104 (e.g., a stereolithography file) for the three-dimensional part may be uploaded as shown in FIG. 2 at 206. Additionally or alternatively, the printability analyzer 102 may be integrated with a Product lifecycle management (PLM) and/or an Enterprise resource planning (ERP) system as shown at 208 to ascertain three-dimensional part information, such as an electronic three-dimensional printing file 104.

A PLM system may be described as an information management system for integrating different aspects of an enterprise. Examples of such aspects may include data, processes, people, etc. Further, an ERP system may be described as the integrated management of processes related to a corporation, where the management may be based on the collection, storage, and interpretation of data from the various activities of the corporation.

For the printability analyzer 102, as disclosed herein, the three-dimensional printing constraints 108 may include three-dimensional part information such as part identification (ID), design constraints, material constraints for the part, dimensions, etc. The material constraints may be known, or selected from a drop-down menu as disclosed herein. Based on an analysis of these three-dimensional printing constraints 108, the printability analyzer 102 may determine whether a part is printable or not printable as disclosed herein, and illustrated at 210 of FIG. 2.

The output of the printability analyzer 102 may include information with respect to the printer specifics (e.g., name, location, manufacturer, etc.), for the three-dimensional printer 114 that is to print the three-dimensional part 106.

The printability analyzer 102 may thus analyze a single three-dimensional part or thousands of three-dimensional parts, for example, included in electronic three-dimensional printing files, determine for each of the three-dimensional parts whether they are printable or not printable, implement intelligent printer selection that includes the comparison of a relatively large number of printers, and the most appropriate material selection by analyzing detailed material properties.

With respect to printability analysis at 212 performed by the printability analyzer 102, the printability analysis may compare the design constraints, the material constraints, and the dimension constraints for the three-dimensional part 106 to be printed with three-dimensional printer attributes 110 for a plurality of three-dimensional printers 112. In this regard, a three-dimensional printer may include attributes such as the type of design that may be printed (e.g., with or without holes, thin parts, etc.), the type of material that may be used, and the size of a three-dimensional part that may be printed. These attributes may be respectively compared to the corresponding design constraints, material constraints, and dimension constraints for the three-dimensional part 106 to determine whether the attributes are met or not met. For example, if the three-dimensional part 106 includes holes, but a three-dimensional printer is not capable of printing holes, then the three-dimensional printer may be removed from further consideration for printing the three-dimensional part 106 (unless the design constraints are modified as also disclosed herein). Similarly, other three-dimensional printers that are capable of printing holes may be retained for further consideration for printing the three-dimensional part 106. Moreover, if no available three-dimensional printer is capable of printing the three-dimensional part 106, then the three-dimensional part 106 may be classified at 214 as a non-printable part in the non-printable parts category.

Once the three-dimensional part 106 is classified as a non-printable part, at 216, the printability analyzer 102 may determine whether the three-dimensional part 106 is not-printable due to material requirements or due to design requirements. In this regard, with respect to material requirements, at 218, the printability analyzer 102 may determine which material constraint (e.g., Iron material) is the cause of the non-printable classification, and ascertain, for example, based on an analysis of equivalent three-dimensional printing materials, equivalent materials (e.g., Titanium) that may be used. At 218, the printability analyzer 102 may output such equivalent materials as alternate printable material suggestions. A user of the system 100 may be prompted to approve or reject the alternate printable material suggestions.

Similarly, with respect to design requirements, the printability analyzer 102 may determine which design requirement is the cause of the non-printable classification, and ascertain, for example, based on an analysis of equivalent three-dimensional printing designs, modifications to the design of the three-dimensional part 106. At 218, the printability analyzer 102 may output such a design modification as a redesign of the three-dimensional part. A user of the system 100 may be prompted to approve or reject the redesign of the part.

With respect to the print evaluator 116, the print evaluator 116 may determine whether, for a three-dimensional part that is determined as printable, the three-dimensional part should be printed. In this regard, at 220, the print evaluator 116 may determine an approximate cost of the three-dimensional part based, for example, on three-dimensional printing (illustrated in FIG. 2 as "additive manufacturing (AM)") versus non-three-dimensional printing based manufacturing (illustrated in FIG. 2 as "traditional manufacturing (TM)"). For example, the non-three-dimensional printing based manufacturing may include traditional manufacturing in an environment that uses machines, other than three-dimensional printers.

The print evaluator 116 may receive three-dimensional part specific details such as the material for a three-dimensional part, total part weight, etc. At 222, the print evaluator 116 may further receive details with respect to non-three-dimensional printing based manufacturing techniques and costs (e.g., the non-three-dimensional printing based manufacturing costs 118) for the three-dimensional part, such as, material costs, labor costs, machine efficiency, the timelines associated with the non-three-dimensional printing based manufacturing techniques, etc. At 224, the print evaluator 116 may also receive details with respect to the three-dimensional printing costs (e.g., the three-dimensional printing costs 120) for the three-dimensional part, including the type of three-dimensional technology being used, the timelines associated with the three-dimensional printing, etc.

According to examples, the three-dimensional printing costs 120 may be based on factors such as cost of post processing due to material, machine maintenance, three-dimensional printing design cost, three-dimensional printing material cost, mold maintenance cost, post processing cost, three-dimensional printing machine running time in a day in hours, etc. Each of these factors may be weighted, for example, as a percent weight to determine the total three-dimensional printing costs 120.

According to examples, the print evaluator 116 may determine a monthly demand as follows:

(total number of parts to be produced)/(timeline in months)

The print evaluator 116 may determine a number of three-dimensional printers needed as follows:

(monthly demand/30)/(three-dimensional printers running time in a day in hours/printing time of 1 part in hours)

For the three-dimensional printing costs 120, the print evaluator 116 may apportion the cost of three-dimensional printers as follows:

(cost of three-dimensional printer/number of three-dimensional parts made of the same material)×number of three-dimensional printers needed For the three-dimensional printing costs 120, the print evaluator 116 may determine a material cost as follows:

per kg cost of material×weight of three-dimensional parts to be produced in Kgs×total number of three-dimensional parts to be produced For the three-dimensional printing costs 120, the print evaluator 116 may determine an energy cost as follows:

hourly per unit cost of energy in three-dimensional printing facility×printing time in hours×total number of three-dimensional parts to be produced For the three-dimensional printing costs 120, the print evaluator 116 may determine a design cost as input by a user.

For the three-dimensional printing costs 120, the print evaluator 116 may determine a post processing cost as follows:

labor hourly wage rate×total number of three-dimensional parts to be produced×post processing time for a unit in hours For the three-dimensional printing costs 120, the print evaluator 116 may determine a three-dimensional printer maintenance cost as provided by a printer manufacture, or specified as approximately 5% of printer cost per year.

For the three-dimensional printing costs 120, the print evaluator 116 may determine a training cost as follows:

training cost for 5-10 employees who can operate and maintain three-dimensional printers For the non-three-dimensional printing based manufacturing costs 118, the print evaluator 116 may determine a design cost, which may be input by a user.

For the non-three-dimensional printing based manufacturing costs 118, the print evaluator 116 may determine part material cost as follows:

total number of three-dimensional parts produced×weight of the three-dimensional part to be produced in Kgs×per kg cost of material×usage of material/weight of the three-dimensional part to be produced in Kgs For the non-three-dimensional printing based manufacturing costs 118, the print evaluator 116 may determine molding labor costs as input by a user.

For the non-three-dimensional printing based manufacturing costs 118, the print evaluator 116 may determine a mold maintenance cost as input by a user, or approximated as a percentage cost of mold cost.

For the non-three-dimensional printing based manufacturing costs 118, the print evaluator 116 may determine a post processing cost as follows:

total number of three-dimensional parts to be produced× labor hourly wage rate×post processing time for unit in hours For the non-three-dimensional printing based manufacturing costs 118, the print evaluator 116 may determine inventory carrying costs as follows:

cost of capital+obsolescence cost

For the non-three-dimensional printing based manufacturing costs 118, the print evaluator 116 may determine any expediting cost as input by a user.

Based on the foregoing, the print evaluator 116 may determine the total three-dimensional printing costs 120 as follows:

cost of three-dimensional printers+material cost+energy cost+design cost+post processing cost+three-dimensional printer maintenance cost+training Based on the foregoing, the print evaluator 116 may determine the total non-three-dimensional printing based manufacturing costs 118 as follows:

design cost+mold cost+part material cost+molding labor cost+mold maintenance cost+post processing cost+inventory carrying costs+expediting cost Based on the foregoing, the print evaluator 116 may determine the per part three-dimensional printing costs 120 as follows:

total cost using three-dimensional printing/total number of three-dimensional parts to be produced Based on the foregoing, the print evaluator 116 may determine the per part non-three-dimensional printing based manufacturing costs 118 as follows:

total cost using non-three-dimensional printing based manufacturing/total number of three-dimensional parts to be produced Referring again to FIG. 2, at 226, based on the costs associated with the non-three-dimensional printing based manufacturing techniques and the three-dimensional printing, the print evaluator 116 may determine whether the three-dimensional printing is a cost-effective option (e.g., if AM<TM, then select three-dimensional printing).

Figure 14:
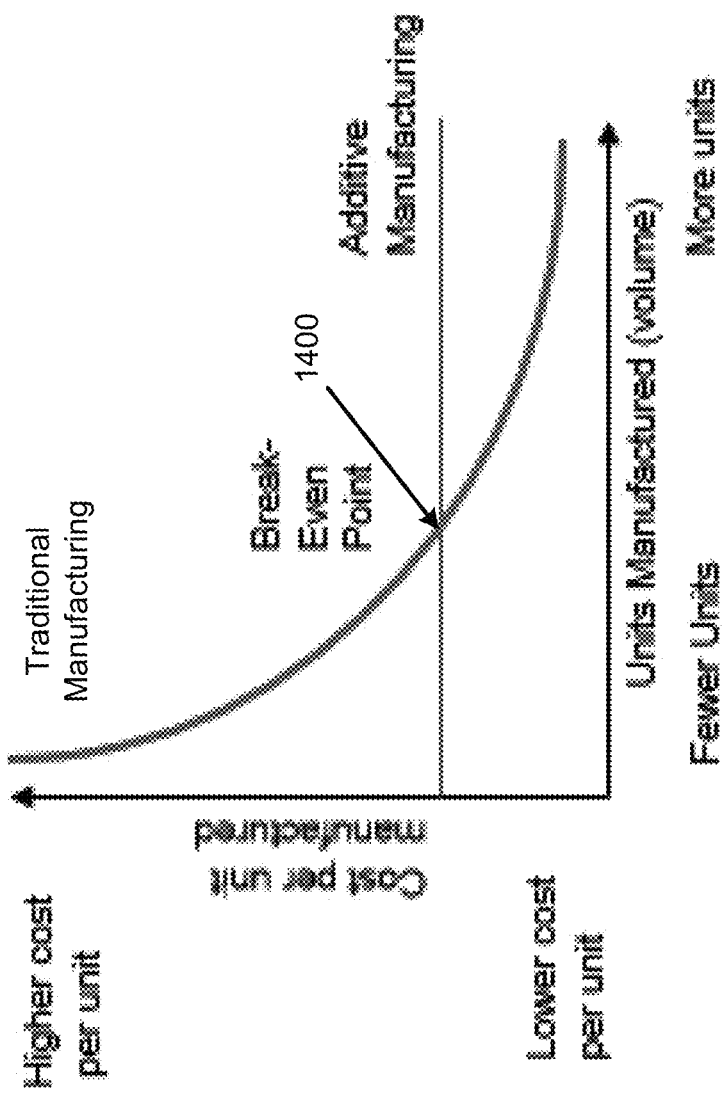
FIG. 14 illustrates a graph of manufacturing using three-dimensional printing and non-three-dimensional printing based manufacturing to illustrate operation of a print evaluator of the decentralized supply chain for three-dimensional printing based on distributed ledger technology system of FIG. 1, according to an example of the present disclosure.
Figure 21:
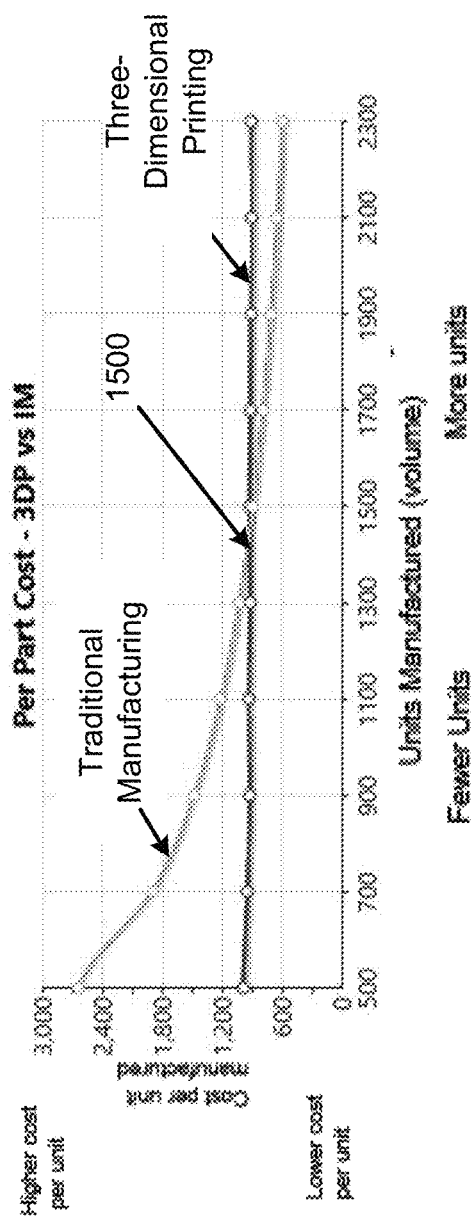
FIG. 21 illustrates a graph for volume analysis for three-dimensional printing and non-three-dimensional printing based manufacturing to illustrate operation of the print evaluator of the decentralized supply chain for three-dimensional printing based on distributed ledger technology system of FIG. 1, according to an example of the present disclosure.

As disclosed herein with respect to FIGS. 14 and 21, the print evaluator 116 may also conduct a volumetric analysis that provides a break-even point up to which the three-dimensional printing would be a more cost effective option, whereas beyond the break-even point, the non-three-dimensional printing based manufacturing techniques would be a more cost effective option.

The costs for the three-dimensional printing may differ from the costs for the non-three-dimensional printing based manufacturing techniques in that for the three-dimensional printing, the costs may include utilization fees associated with electronic three-dimensional printing files, costs associated with usage of a three-dimensional printer, and costs associated with transfer of a printed part from the three-dimensional printer to a purchaser. Whereas, for non-three-dimensional printing based manufacturing techniques, the costs may include costs for components used for the non-three-dimensional printing based manufacturing techniques, factory costs for the non-three-dimensional printing based manufacturing techniques, labor costs for the non-three-dimensional printing based manufacturing techniques, and further costs associated with transfer of a manufactured part from the manufacturer to the purchaser. Thus, logistics costs such as warehousing, etc., associated with non-three-dimensional printing based manufacturing techniques may not be applicable to the three-dimensional printing costs.

At 228, if it is determined that the three-dimensional printing is not a cost effective option (e.g., AM>TM), then the print evaluator 116 may perform a case-by-case analysis to determine whether the three-dimensional part 106 should be printed by three-dimensional printing or by manufactured by non-three-dimensional printing based manufacturing. For example, at 230, the print evaluator 116 may evaluate supply chain and performance benefits with respect to three-dimensional printing versus non-three-dimensional printing based manufacturing. At 232, if the benefits of three-dimensional printing are greater than the costs of three-dimensional printing, then the print evaluator 116 may determine that the three-dimensional part is to be manufactured by three-dimensional printing, and otherwise, at 234, non-three-dimensional printing based manufacturing may be used to manufacture the three-dimensional part.

With respect to the digital integrator 126, once the three-dimensional part 106 is identified as being printable by a three-dimensional printer, and determined as being a viable three-dimensional part that should be printed by a three-dimensional printer, the digital integrator 126 may control the printing with respect to the three-dimensional part 106. In this regard, the digital integrator 126 may determine which platform may be used to print the three-dimensional part 106, where the three-dimensional part 106 may be printed, when the three-dimensional part 106 may be printed, etc. The digital integrator 126 may securely print the three-dimensional part 106. In this regard, the digital integrator 126 may control operation of a three-dimensional printer that is to print the three-dimensional part 106. Further, the digital integrator 126 may control access to the electronic three-dimensional printing file 104 associated with the three-dimensional part 106.

If an electronic three-dimensional printing file is not available, the digital integrator 126 may control scanning of the three-dimensional part 106. For example, the digital integrator 126 may control scanning of the three-dimensional part 106 by controlling or otherwise performing scanning of a virtual model of the three-dimensional part 106.

The digital integrator 126 may coordinate printing of the three-dimensional part between various remote destinations. For example, a user of the three-dimensional part 106 may utilize the digital integrator 126 to control printing of a three-dimensional part 106 from a control location in Europe to a location in Asia where the three-dimensional part 106 is printed. In this regard, a user of the three-dimensional part 106 may utilize the digital integrator 126 to control printing of a part from a control location at a first geographical location to a second geographical location where the three-dimensional part 106 is printed, and further, with a third geographical location where the three-dimensional part may be shipped to.

The digital integrator 126 may manage printing of a three-dimensional part 106 that includes multiple components by determining one or a plurality of locations and/or three-dimensional printers at which the components may be printed. In this regard, locations and/or three-dimensional printers may be specified in a hierarchal format according to priority such that if a higher priority location and/or three-dimensional printer cannot be used to print the three-dimensional part 106, a second higher priority location and/or three-dimensional printer may be used to print the three-dimensional part 106, and so forth. The hierarchy of the location and/or three-dimensional printer may be based on a variety of factors such as cost of printing, timing of printing, other print jobs in a queue, past printing activities, etc.

The digital integrator 126 may be built over a blockchain network. In this regard, the blockchain network may operate as the distributed electronic ledger 128 and provide for tracking and tracing of a print job. For example, with respect to an electronic three-dimensional printing file 104, the blockchain network may provide an electronic three-dimensional printing file owner with information such as which distributor utilized the electronic three-dimensional printing file 104, how many times the electronic three-dimensional printing file 104 was used, etc.

The digital integrator 126 may operate as a front-facing virtual inventory management system with respect to printing of three-dimensional parts using three-dimensional printers.

With respect to the distributed electronic ledger 128, a user may make an electronic three-dimensional printing file 104 available for printing. The user may upload the electronic three-dimensional printing file 104 on the distributed electronic ledger 128. Once the electronic three-dimensional printing file 104 is uploaded on the distributed electronic ledger 128, the distributed electronic ledger 128 may control transactions with respect to rights to print a three-dimensional part 106 using the uploaded electronic three-dimensional printing file 104. Thus, the distributed electronic ledger 128 may control permissions to print a three-dimensional part 106 using the uploaded electronic three-dimensional printing file 104.

With respect to the online catalogue 236 or the authorized dealer 238, these entities may upload electronic three-dimensional printing files to the distributed electronic ledger 128, and may further utilize the distributed electronic ledger 128 to control permissions to print a three-dimensional part 106 using the uploaded electronic three-dimensional printing files. In this regard, the permissions may be controlled to allow or deny a retailer such as retailer-1 and/or retailer-2 at 240 to have access to the uploaded electronic three-dimensional printing files, to thus print a three-dimensional part 106 using the uploaded electronic three-dimensional printing files.

The distributed electronic ledger 128 may also control tracking of material batches as shown at 242. In this regard, the owner of the electronic three-dimensional printing file may be ensured that the correct materials are used to manufacture the three-dimensional part 106.

Once a three-dimensional part 106 is printed, the printed three-dimensional part 106 may be delivered to a customer, for example, at 244. At the point of the delivery or otherwise, the bank payment (e.g., by the bank 204) may be controlled by the distributed electronic ledger 128.

The digital integrator 126 in conjunction with the distributed electronic ledger 128 may thus provide for virtualization and decentralization of an entire supply chain for a plurality of three-dimensional parts. For example, the digital integrator 126 in conjunction with the distributed electronic ledger 128 may provide for virtual control of a supply chain of three-dimensional parts from a first location, where a three-dimensional part is to be supplied to a second remote location where the three-dimensional part is manufactured.

FIG. 3 illustrates a user interface display for adding a new project to illustrate operation of a printability analyzer of the system 100, according to an example of the present disclosure.

Referring to FIG. 3, entry of a new three-dimensional part may begin by starting a new project or opening an existing project (e.g., as shown).

FIG. 4 illustrates a user interface display for adding a new project designated "R&D Transformation project" to illustrate operation of the printability analyzer of the system 100, according to an example of the present disclosure.

Referring to FIG. 4, the new project for analyzing a new three-dimensional part 106 to be printed may be designated "R&D Transformation project".

FIG. 5 illustrates a user interface display for adding data to illustrate operation of the printability analyzer of the system 100, according to an example of the present disclosure.

Referring to FIG. 5, two options may be used to analyze data associated with a three-dimensional part to be printed. For example, the data with respect to a three-dimensional part to be printed may be entered one by one, or multiple entries may be uploaded using a template.

FIG. 6 illustrates a user interface display for creation of a part to illustrate operation of the printability analyzer of the system 100, according to an example of the present disclosure.

Referring to FIG. 6, a three-dimensional part 106 to be printed may include a part identification (ID), a part name, and a component (to which the part belongs) name.

FIG. 7 illustrates a user interface display for creation of a part including a part identification "8745" to illustrate operation of the printability analyzer of the system 100, according to an example of the present disclosure.

Referring to FIG. 7, the three-dimensional part 106 to be printed may include a part identification "8745", a part name "Engine", and a component (to which the part belongs) name "Compressor".

Figure 8:
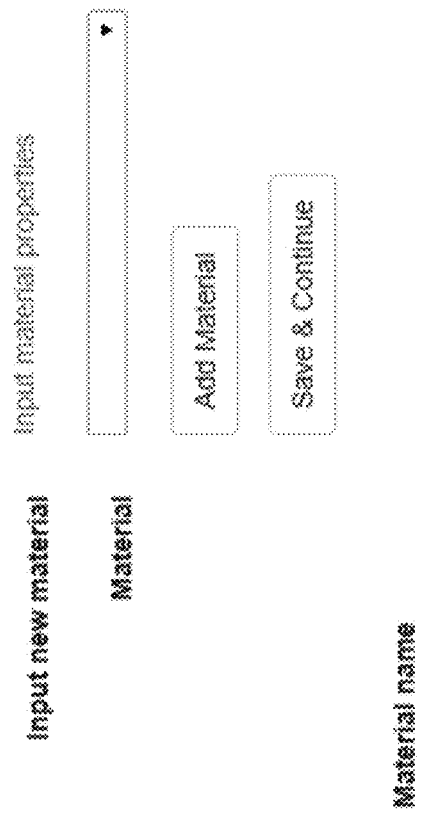
FIG. 8 illustrates a user interface display for entry of material constraints for a new part to illustrate operation of the printability analyzer of the decentralized supply chain for three-dimensional printing based on distributed ledger technology system of FIG. 1, according to an example of the present disclosure.

FIG. 8 illustrates a user interface display for entry of material constraints for a new part to illustrate operation of the printability analyzer of the system 100, according to an example of the present disclosure.

Referring to FIG. 8, the material for the three-dimensional part 106 to be printed may be entered or selected from a dropdown list. A user may select the material from the dropdown menu in case the user knows the material of the three-dimensional part 106. If in case the user does not know the material but knows the constraint in which the three-dimensional part 106 is going to be operate, the user may select input material properties and the user interface display of FIG. 9 may be generated.

FIG. 9 illustrates a user interface display for entry of material constraints for a new part to illustrate operation of the printability analyzer of the system 100, according to an example of the present disclosure.

Referring to FIG. 9, if the material for the three-dimensional part 106 to be printed is not known, then material properties may be entered. The input of the properties may be used by the printability analyzer 102 to suggest the material that corresponds to entered properties.

Figure 10:
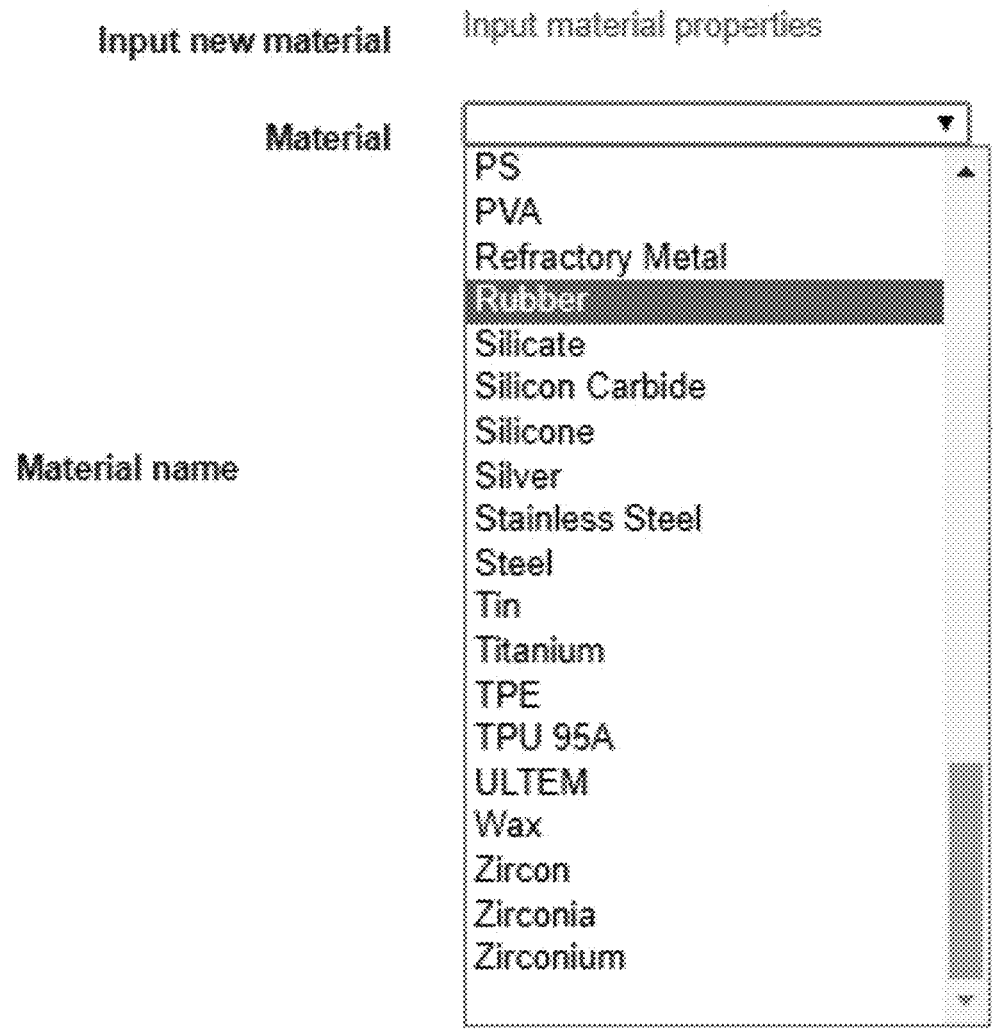
FIG. 10 illustrates a user interface display for entry of material constraints from a dropdown list for a new part to illustrate operation of the printability analyzer of the decentralized supply chain for three-dimensional printing based on distributed ledger technology system of FIG. 1, according to an example of the present disclosure.

FIG. 10 illustrates a user interface display for entry of material constraints from a dropdown list for a new part to illustrate operation of the printability analyzer of the system 100, according to an example of the present disclosure.

Referring to FIG. 10, when the material for the three-dimensional part 106 to be printed is known, the material may be selected from a dropdown menu.

FIG. 11 illustrates a user interface display for entry of part dimension details for a new part to illustrate operation of the printability analyzer of the system 100, according to an example of the present disclosure.

Referring to FIG. 11, details of the three-dimensional part 106 to be printed may be entered. The details may include min/max height, min/max width, etc. The details may provide the dimension constraints for the three-dimensional part 106 to be printed. The details may also include a quality assurance (QA) level field that may have values (e.g., levels) form 1-5. This factor may be used to determine how closely to match the material properties where level-1 is the highest and level-5 is the lowest. For example, a level-1 may allow a 2% deviation, a level-2 may allow a 5% deviation, a level-3 may allow an 8% deviation, a level-4 may allow a 10% deviation, and a level-5 may allow a 15% deviation.

FIG. 12 illustrates a user interface display for analysis results to illustrate operation of the printability analyzer of the system 100, according to an example of the present disclosure.

Referring to FIG. 12, the analysis results show that the three-dimensional part 106 is "print ready", which means that the three-dimensional part 106 is printable by an available three-dimensional printer.

FIG. 13 illustrates a user interface display for available three-dimensional printers to illustrate operation of the printability analyzer of the system 100, according to an example of the present disclosure.

Referring to FIG. 13, for the example of FIGS. 3-12, for the three-dimensional part 106 with identification "8745", several three-dimensional printers may be listed as being available. For example, the list of the three-dimensional printers may include a printer name column, a printer manufacturer column, a printer location column (not shown), a printer status column (not shown), etc.

FIG. 14 illustrates a graph of manufacturing using three-dimensional printing and non-three-dimensional printing based manufacturing to illustrate operation of a print evaluator of the system 100, according to an example of the present disclosure.

Referring to FIG. 14, the graph of manufacturing using three-dimensional printing (e.g., additive manufacturing) and non-three-dimensional printing based manufacturing (e.g., traditional manufacturing) shows that for three-dimensional printing, the cost per unit manufactured for a three-dimensional part remains constant. For non-three-dimensional printing based manufacturing, the cost per unit manufactured for a three-dimensional part varies based on the volume of the units. In this regard, a break-even point at 1400 may indicate a point where the cost per unit manufactured using three-dimensional printing and non-three-dimensional printing based manufacturing is identical. In this regard, for a number of units of a three-dimensional part that is less than the number of units at the break-even point at 1400, the print evaluator 116 may determine that such a number of units is to be manufactured using three-dimensional printing (e.g., where AM<TM as disclosed herein with respect to FIG. 2).

Figure 15:
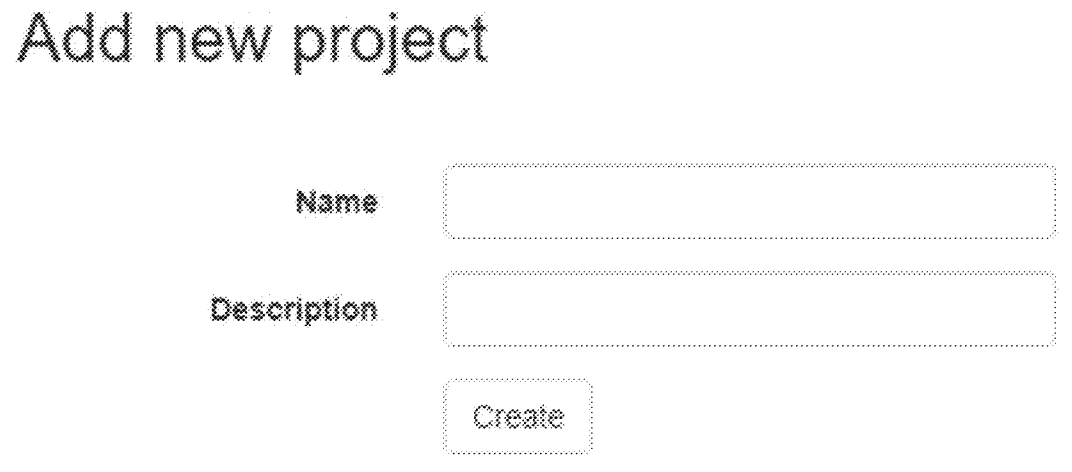

FIG. 15 illustrates a user interface display for adding a new project to illustrate operation of the print evaluator of the system 100, according to an example of the present disclosure.

Referring to FIG. 15, entry of a new three-dimensional part may begin by starting a new project or opening an existing project (e.g., as shown).

FIG. 16 illustrates a user interface display for adding a new project designated "R&D Transformation project" to illustrate operation of the print evaluator of the system 100, according to an example of the present disclosure.

Referring to FIG. 16, the new project for analyzing a new three-dimensional part 106 to be printed may be designated "R&D Transformation project".

Figure 17:
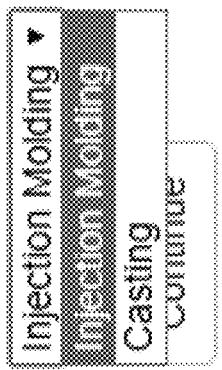
FIG. 17 illustrates a user interface display for adding data to illustrate operation of the print evaluator of the decentralized supply chain for three-dimensional printing based on distributed ledger technology system of FIG. 1, according to an example of the present disclosure.

FIG. 17 illustrates a user interface display for adding data to illustrate operation of the print evaluator of the system 100, according to an example of the present disclosure.

Referring to FIG. 17, two options may be used to analyze data associated with a three-dimensional part to be printed. For example, the data with respect to a three-dimensional part to be printed may be entered one by one, or multiple entries may be uploaded using a template.

FIG. 18 illustrates a user interface display for part manufacturing information related with traditional manufacturing or non-three-dimensional printing to illustrate operation of the print evaluator of the system 100, according to an example of the present disclosure.

Referring to FIG. 18, the inputs for the three-dimensional part constraints may be dependent on the particular industry and geography. These rates are then factored into further calculations with respect to the non-three-dimensional printing based manufacturing costs 118 and three-dimensional printing costs 120.

FIG. 19 illustrates a user interface display for non-three-dimensional printing based manufacturing costs for non-three-dimensional printing based manufacturing to illustrate operation of the print evaluator of the system 100, according to an example of the present disclosure.

Referring to FIG. 19, a specific example of inputs for injection molding is illustrated with respect to determination of non-three-dimensional printing based manufacturing costs 118.

FIG. 20 illustrates a user interface display for three-dimensional printing costs for three-dimensional printing to illustrate operation of the print evaluator of the system 100, according to an example of the present disclosure.

Referring to FIG. 20, inputs for determination of three-dimensional printing costs 120 for three-dimensional printing are illustrated.

FIG. 21 illustrates a graph for volume analysis for three-dimensional printing and non-three-dimensional printing based manufacturing to illustrate operation of the print evaluator of the system 100, according to an example of the present disclosure.

Referring to FIG. 21, based on the costs incurred in manufacturing using injection molding (see FIG. 19) and the estimated costs of three-dimensional printing (see FIG. 20), the print evaluator 116 may generate a graphical representation of the break even quantity (e.g., at 1500) beyond which it is more economical to produce parts using traditional manufacturing.

Figure 22:
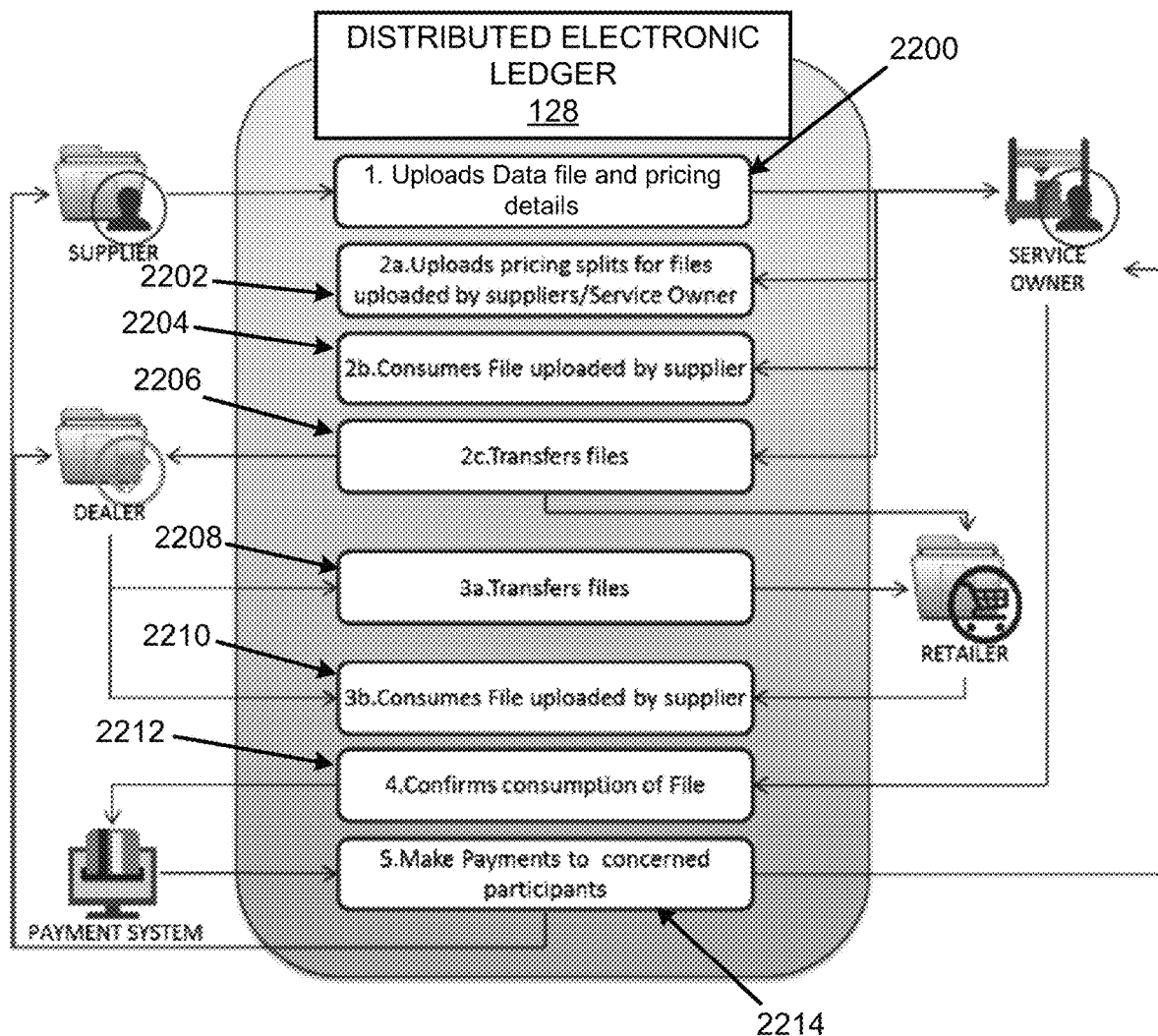
FIG. 22 illustrates details of the architecture of a distributed electronic ledger of the decentralized supply chain for three-dimensional printing based on distributed ledger technology system of FIG. 1, according to an example of the present disclosure.

FIG. 22 illustrates details of the architecture of a distributed electronic ledger of the system 100, according to an example of the present disclosure.

Referring to FIG. 22, with respect to the distributed electronic ledger 128 that may include a blockchain network, users may be enrolled into the distributed electronic ledger 128 with their respective credentials. Once users across the network including suppliers, retailers, service owners, dealers and the payment system are enrolled, transactions may be made by the respective participants by utilizing the distributed electronic ledger 128.

At 2200, a supplier or service owner may upload a data file (e.g., including the electronic three-dimensional printing file 104) and pricing details on the distributed electronic ledger 128. The distributed electronic ledger 128 may include contract management and permission management to allow respective users to access, move, and utilize the data files for three-dimensional printing. The payment system may enable transfer of payments across the participants in a network as needed.

At 2202, the service owner may upload pricing splits (e.g., divisions) for the data files uploaded by suppliers and/or the service owner.

At 2204, the distributed electronic ledger 128 may consume the data files uploaded by the supplier.

At 2206, the service owner may transfer the data files to the dealer and/or retailer.

At 2208, the dealer may transfer the data files to the retailer.

At 2210, the distributed electronic ledger 128 may consume the data files uploaded by the supplier.

At 2212, the distributed electronic ledger 128 may confirm consumption of data files.

At 2214, the payment system may make payments to concerned participants.

With respect to the distributed electronic ledger of FIG. 22, the distributed electronic ledger powered digital inventory may execute specific rules or validations as follows. For example, according to a rule, based on a supplier's and service provider's pricing inputs and pre-defined conditions, the payment made by either the dealer, retailer, or service provider may be divided and allocated to the respective supplier, service provider, or dealer. According to another example of a rule, the payment may be made each time a data file is executed. According to another example of a rule, the view access of specific data elements may be controlled for respective participants based on pre-defined conditions.

For the example of FIG. 22, roles of the entities including supplier, service owner, dealer, retailer, and payment system may be defined as follows.

A supplier may represent a designer of data files and sell rights, for example, to a service owner. With respect to the supplier roles, a supplier may upload a data file, view the number of times the data file has been accessed for execution, specify the charges per usage of the uploaded file, receive payments against usage of the file uploaded, and view the history of payments received. A supplier may further control aspects such as a number of data files that are subject to sale of rights, a time of printing associated with each data file, a price for licensing and/or printing associated with each data file, and a payment status.

A service owner may represent an owner of a permissioned blockchain network as disclosed herein. With respect to the service owner roles, a service owner may upload a data file, access the file uploaded by the supplier, view the number of times any file has been accessed for execution, input a number of times a file has been used into the distributed electronic ledger 128, transfer the files to dealers and retailers, receive payments on file transfers and usage of the data files, specify the charges per usage of the uploaded file, view the history of payments received, and view overall details of the files usage and availability at multiple participants. A service owner may further control aspects such as price, current ownership, inventory with each player, printing status, printing time, payment status, batch number, and terms of other transactions associated with data files.

A dealer may effectively represent a distributor. With respect to the dealer roles, a dealer may receive data files from a service owner, access the file uploaded by a supplier or service owner, view the number of times the file is procured, view the number of times the file has been accessed for execution, receive payments against usage of the file sold to a retailer, and view the history of payments received. A dealer may further control aspects such as price, current ownership (retailer), inventory with each retailer, printing status, printing time, payment status, inventory, and payment cycle for retailers.

A retailer may represent a vendor of a three-dimensional printer. With respect to the retailer roles, a retailer may receive data files from dealers and a service owner, access the file procured from dealers and a service owner, view the number of times the file been accessed for execution, make payment for a file procured for use, and view the history of payments made. A retailer may further control aspects such as price, uploader, dealer, inventory, printing time, raw material batch number, and payment status associated with the three-dimensional printing.

With respect to the payment system, the payment system may make payments for service owner, dealer, and retailer procurement of files, access the price of the file as well as any predefined payment division algorithm to transfer amounts to concerned parties, and view the history of payments done.

Figure 23:
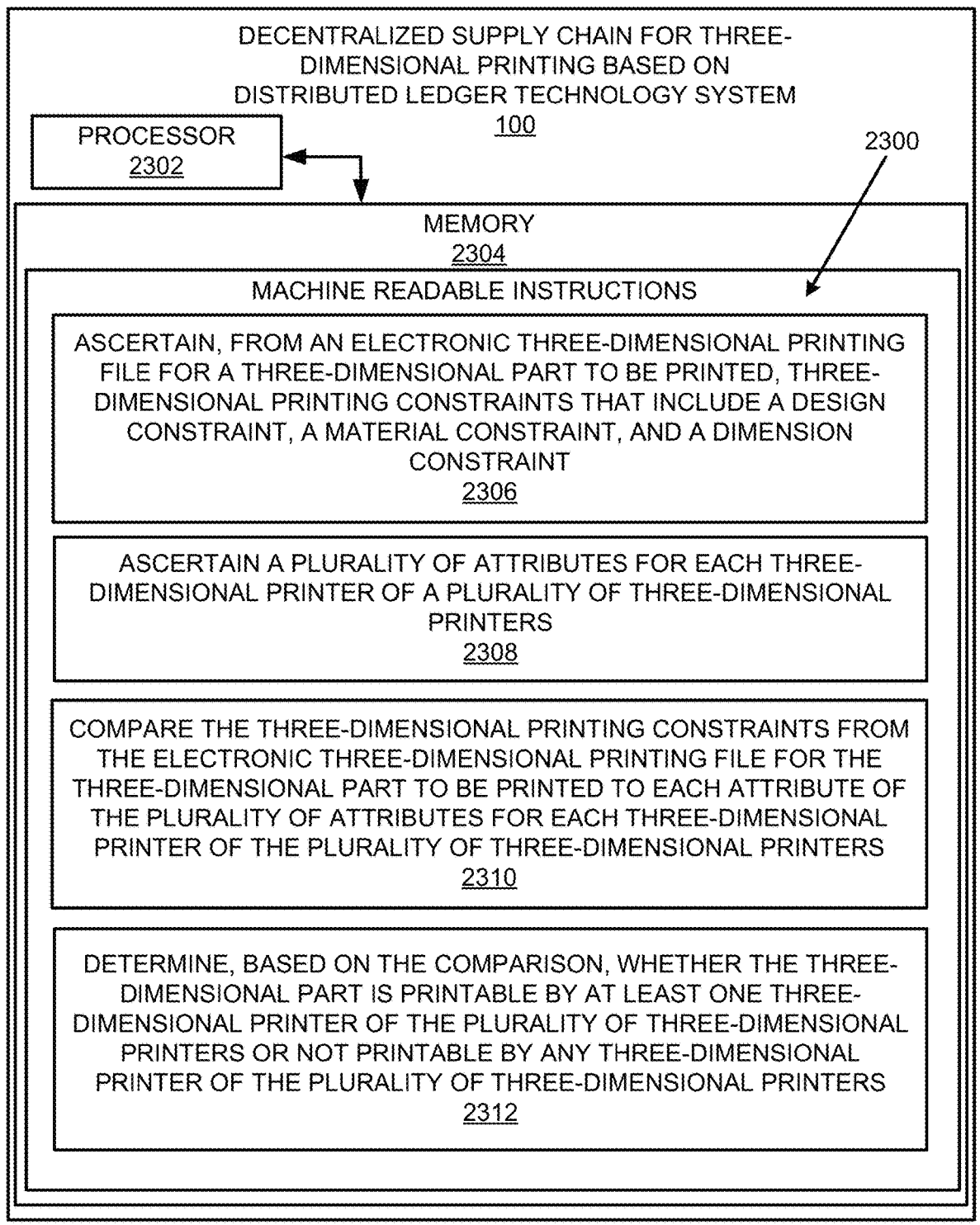
FIG. 23 illustrates a block diagram for decentralized supply chain for three-dimensional printing based on distributed ledger technology, according to an example of the present disclosure.
Figure 23:
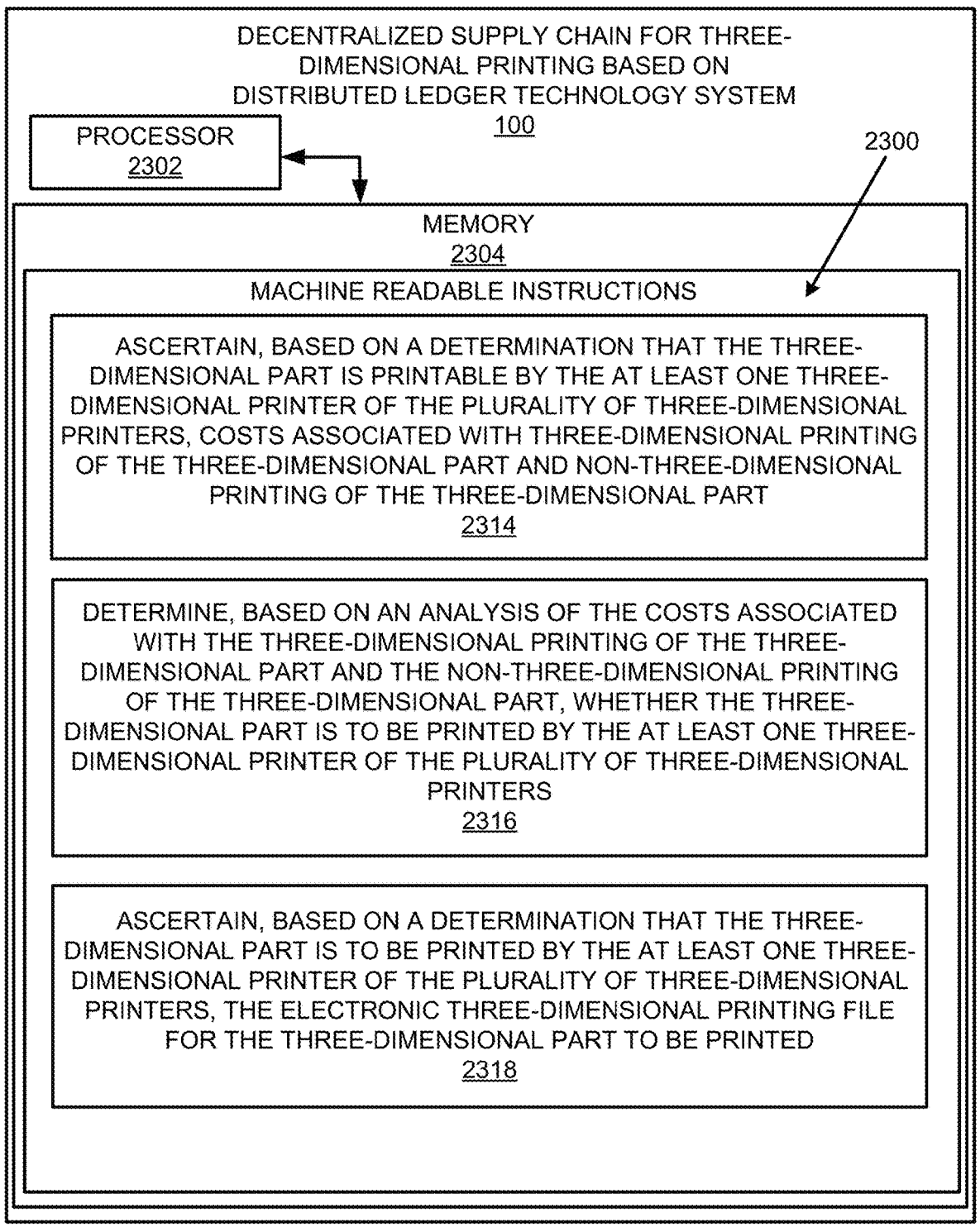
Figure 23:
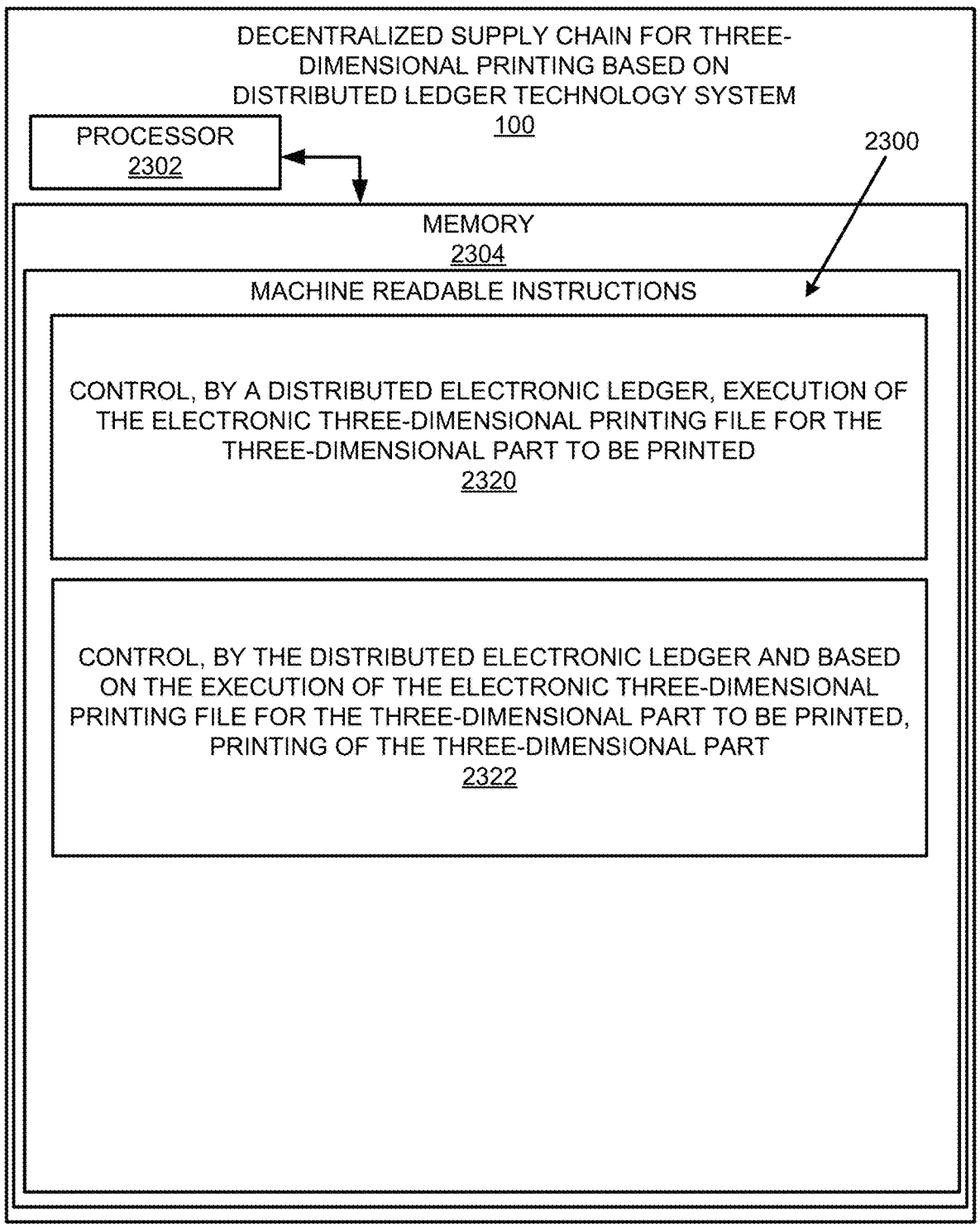
Figure 25:
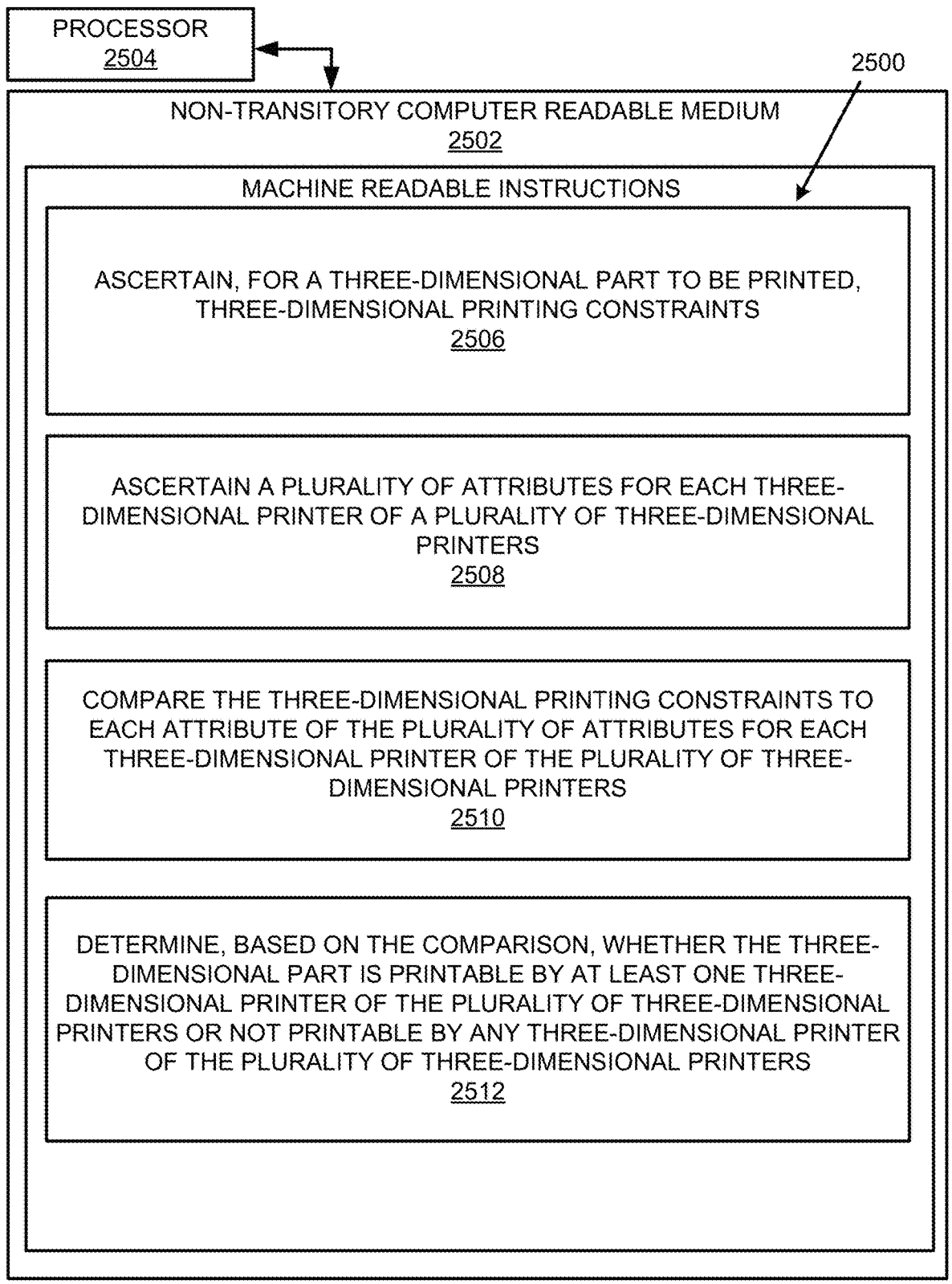
FIG. 25 illustrates a further block diagram for decentralized supply chain for three-dimensional printing based on distributed ledger technology, according to an example of the present disclosure.
Figure 25:
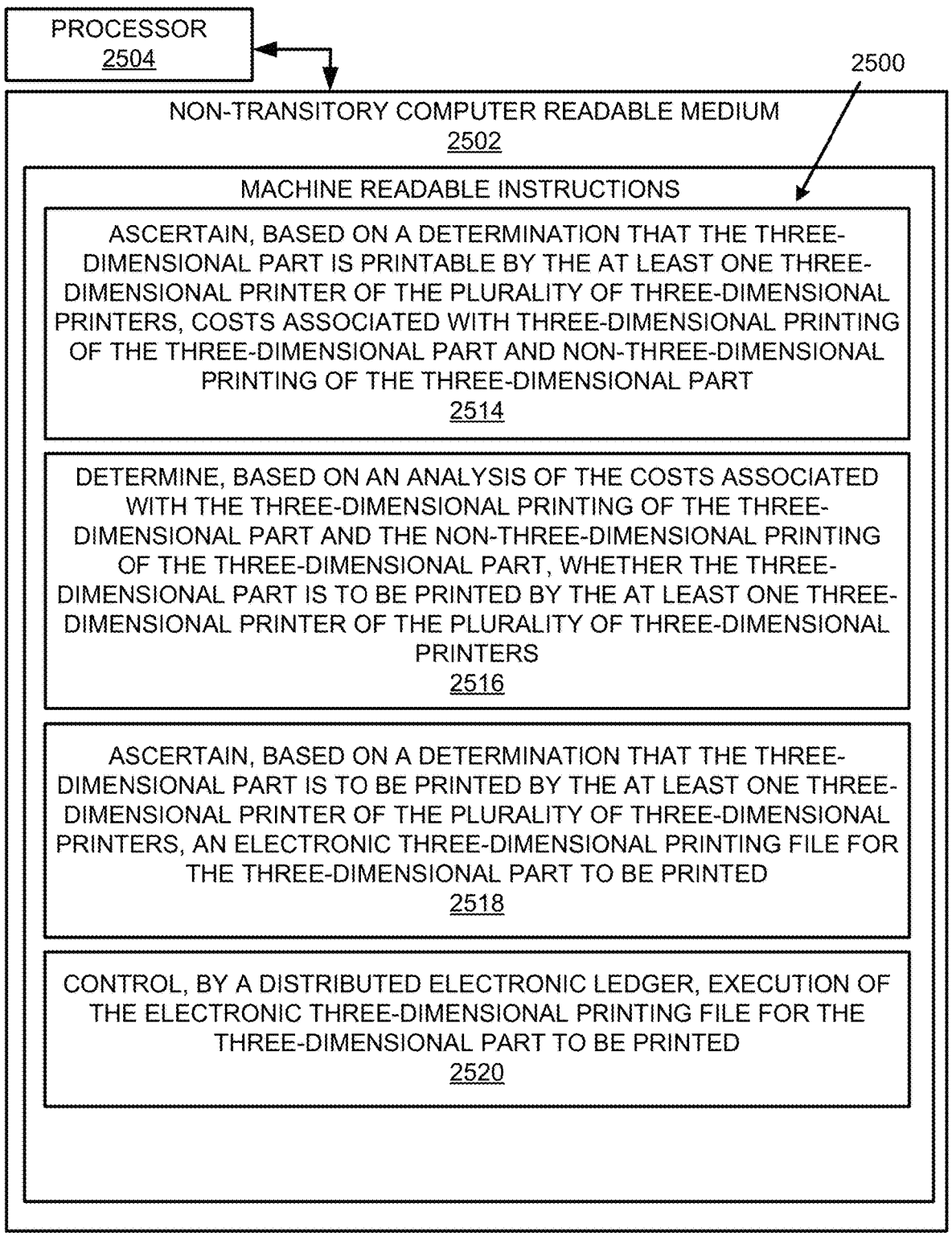
Figure 25:
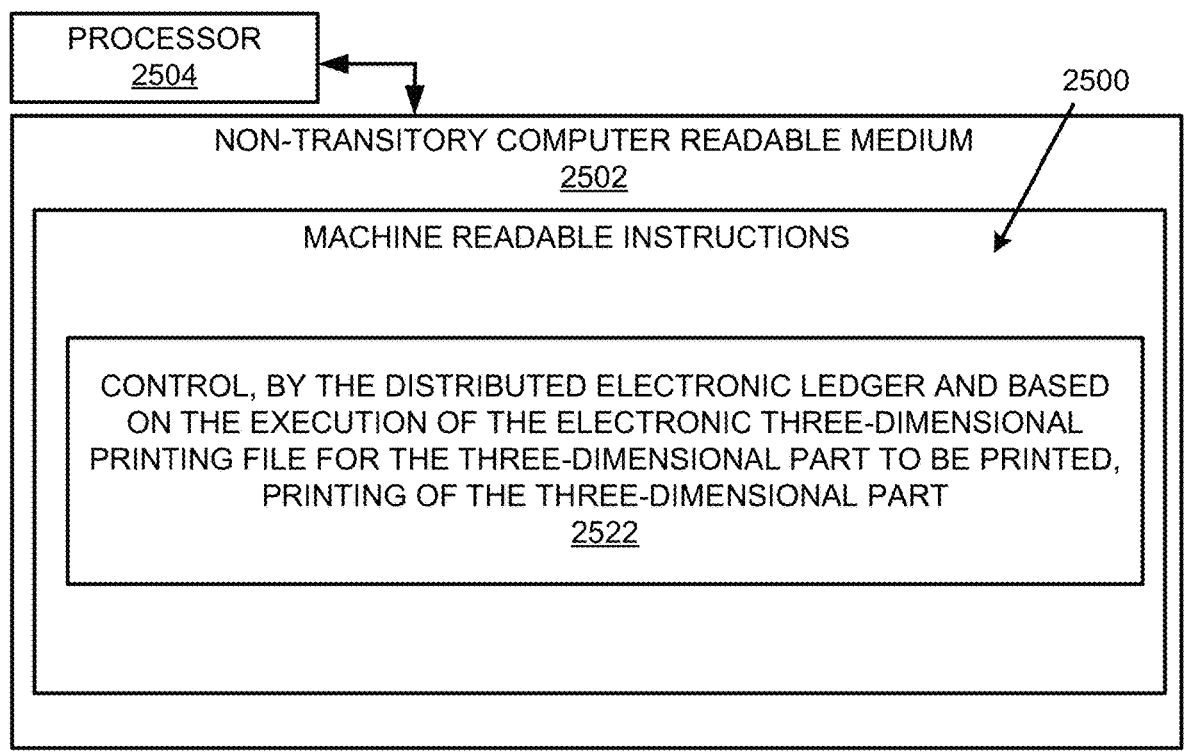

FIGS. 23-25 respectively illustrate a block diagram 2300, a flowchart of a method 2400, and a further block diagram 2500 for a decentralized supply chain for three-dimensional printing based on distributed ledger technology, according to examples. The block diagram 2300, the method 2400, and the block diagram 2500 may be implemented on the system 100 described above with reference to FIG. 1 by way of example and not limitation. The block diagram 2300, the method 2400, and the block diagram 2500 may be practiced in other systems. In addition to showing the block diagram 2300, FIG. 23 shows hardware of the system 100 that may execute the instructions of the block diagram 2300. The hardware may include a processor 2302, and a memory 2304 storing machine readable instructions that when executed by the processor cause the processor to perform the instructions of the block diagram 2300. The memory 2304 may represent a non-transitory computer readable medium. FIG. 24 may represent a method for implementing a decentralized supply chain for three-dimensional printing based on distributed ledger technology, and the steps of the method. FIG. 25 may represent a non-transitory computer readable medium 2502 having stored thereon machine readable instructions to provide a decentralized supply chain for three-dimensional printing based on distributed ledger technology. The machine readable instructions, when executed, cause a processor 2504 to perform the instructions of the block diagram 2500 also shown in FIG. 25.

The processor 2302 of FIG. 23 and/or the processor 2504 of FIG. 25 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 2502 of FIG. 25), such as hardware storage devices (e.g., RAM (random access memory), ROM (read only memory), EPROM (erasable, programmable ROM), EEPROM (electrically erasable, programmable ROM), hard drives, and flash memory). The memory 2304 may include a RAM, where the machine readable instructions and data for a processor may reside during runtime.

Referring to FIGS. 1-23, and particularly to the block diagram 2300 shown in FIG. 23, the memory 2304 may include instructions 2306 to ascertain, from an electronic three-dimensional printing file 104 for a three-dimensional part 106 to be printed, three-dimensional printing constraints 108 that include a design constraint, a material constraint, and a dimension constraint.

The processor 2302 may fetch, decode, and execute the instructions 2308 to ascertain a plurality of attributes 110 for each three-dimensional printer of a plurality of three-dimensional printers 112.

The processor 2302 may fetch, decode, and execute the instructions 2310 to compare the three-dimensional printing constraints 108 from the electronic three-dimensional printing file 104 for the three-dimensional part 106 to be printed to each attribute of the plurality of attributes 110 for each three-dimensional printer of the plurality of three-dimensional printers 112.

The processor 2302 may fetch, decode, and execute the instructions 2312 to determine, based on the comparison, whether the three-dimensional part 106 is printable by at least one three-dimensional printer of the plurality of three-dimensional printers 112 or not printable by any three-dimensional printer of the plurality of three-dimensional printers 112.

The processor 2302 may fetch, decode, and execute the instructions 2314 to ascertain, based on a determination that the three-dimensional part 106 is printable by the at least one three-dimensional printer of the plurality of three-dimensional printers 112, costs associated with three-dimensional printing of the three-dimensional part 106 and non-three-dimensional printing based manufacturing of the three-dimensional part 106.

The processor 2302 may fetch, decode, and execute the instructions 2316 to determine, based on an analysis of the costs associated with the three-dimensional printing of the three-dimensional part 106 and the non-three-dimensional printing based manufacturing of the three-dimensional part 106, whether the three-dimensional part 106 is to be printed by the at least one three-dimensional printer of the plurality of three-dimensional printers 112.

The processor 2302 may fetch, decode, and execute the instructions 2318 to ascertain, based on a determination that the three-dimensional part 106 is to be printed by the at least one three-dimensional printer of the plurality of three-dimensional printers 112, the electronic three-dimensional printing file 104 for the three-dimensional part 106 to be printed.

The processor 2302 may fetch, decode, and execute the instructions 2320 to control, by a distributed electronic ledger 128, execution of the electronic three-dimensional printing file 104 for the three-dimensional part 106 to be printed.

The processor 2302 may fetch, decode, and execute the instructions 2322 to control, by the distributed electronic ledger 128 and based on the execution of the electronic three-dimensional printing file 104 for the three-dimensional part 106 to be printed, printing of the three-dimensional part 106.

Referring to FIGS. 1-22 and 24, and particularly FIG. 24, for the method 2400, at block 2402, the method may include ascertaining, from an electronic stereolithography file for a three-dimensional part 106 to be printed, three-dimensional printing constraints 108 that include a design constraint, a material constraint, and a dimension constraint. In this regard, instead of the electronic stereolithography file, the file may include other formats that may be used for printing the three-dimensional part 106.

At block 2404, the method may include ascertaining a plurality of attributes 110 for each three-dimensional printer of a plurality of three-dimensional printers 112.

At block 2406, the method may include comparing the three-dimensional printing constraints 108 from the electronic stereolithography file for the three-dimensional part 106 to be printed to each attribute of the plurality of attributes 110 for each three-dimensional printer of the plurality of three-dimensional printers 112.

At block 2408, the method may include determining, based on the comparison, whether the three-dimensional part 106 is printable by at least one three-dimensional printer of the plurality of three-dimensional printers 112 or not printable by any three-dimensional printer of the plurality of three-dimensional printers 112.

At block 2410, the method may include ascertaining, based on a determination that the three-dimensional part 106 is printable by the at least one three-dimensional printer of the plurality of three-dimensional printers 112, costs associated with three-dimensional printing of the three-dimensional part 106 and non-three-dimensional printing based manufacturing of the three-dimensional part 106.

At block 2412, the method may include determining, based on an analysis of the costs associated with the three-dimensional printing of the three-dimensional part 106 and the non-three-dimensional printing based manufacturing of the three-dimensional part 106, whether the three-dimensional part 106 is to be printed by the at least one three-dimensional printer of the plurality of three-dimensional printers 112.

At block 2414, the method may include ascertaining, based on a determination that the three-dimensional part 106 is to be printed by the at least one three-dimensional printer of the plurality of three-dimensional printers 112, the electronic stereolithography file for the three-dimensional part 106 to be printed.

At block 2416, the method may include controlling, by a blockchain network, execution of the electronic stereolithography file for the three-dimensional part 106 to be printed.

At block 2418, the method may include controlling, by the blockchain network and based on the execution of the electronic stereolithography file for the three-dimensional part 106 to be printed, printing of the three-dimensional part 106.

Referring to FIGS. 1-22 and 25, and particularly FIG. 25, for the block diagram 2500, the non-transitory computer readable medium 2502 may include instructions 2506 to ascertain, for a three-dimensional part 106 to be printed, three-dimensional printing constraints 108.

The processor 2504 may fetch, decode, and execute the instructions 2508 to ascertain a plurality of attributes 110 for each three-dimensional printer of a plurality of three-dimensional printers 112.

The processor 2504 may fetch, decode, and execute the instructions 2510 to compare the three-dimensional printing constraints 108 to each attribute of the plurality of attributes 110 for each three-dimensional printer of the plurality of three-dimensional printers 112.

The processor 2504 may fetch, decode, and execute the instructions 2512 to determine, based on the comparison, whether the three-dimensional part 106 is printable by at least one three-dimensional printer of the plurality of three-dimensional printers 112 or not printable by any three-dimensional printer of the plurality of three-dimensional printers 112.

The processor 2504 may fetch, decode, and execute the instructions 2514 to ascertain, based on a determination that the three-dimensional part 106 is printable by the at least one three-dimensional printer of the plurality of three-dimensional printers 112, costs associated with three-dimensional printing of the three-dimensional part 106 and non-three-dimensional printing based manufacturing of the three-dimensional part 106.

The processor 2504 may fetch, decode, and execute the instructions 2516 to determine, based on an analysis of the costs associated with the three-dimensional printing of the three-dimensional part 106 and the non-three-dimensional printing based manufacturing of the three-dimensional part 106, whether the three-dimensional part 106 is to be printed by the at least one three-dimensional printer of the plurality of three-dimensional printers 112.

The processor 2504 may fetch, decode, and execute the instructions 2518 to ascertain, based on a determination that the three-dimensional part 106 is to be printed by the at least one three-dimensional printer of the plurality of three-dimensional printers 112, an electronic three-dimensional printing file 104 for the three-dimensional part 106 to be printed.

The processor 2504 may fetch, decode, and execute the instructions 2520 to control, by a distributed electronic ledger, execution of the electronic three-dimensional printing file 104 for the three-dimensional part 106 to be printed.

The processor 2504 may fetch, decode, and execute the instructions 2522 to control, by the distributed electronic ledger and based on the execution of the electronic three-dimensional printing file 104 for the three-dimensional part 106 to be printed, printing of the three-dimensional part 106.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A system comprising:
    a printability analyzer, executed by at least one hardware processor, to
        ascertain, from an electronic three-dimensional printing file for a three-dimensional part to be printed, three-dimensional printing constraints that include a design constraint, a material constraint, and a dimension constraint,
        ascertain a plurality of attributes for each three-dimensional printer of a plurality of three-dimensional printers,
        compare the three-dimensional printing constraints from the electronic three-dimensional printing file for the three-dimensional part to be printed to each attribute of the plurality of attributes for each three-dimensional printer of the plurality of three-dimensional printers, and
        determine, based on the comparison, whether the three-dimensional part is printable by at least one three-dimensional printer of the plurality of three-dimensional printers or not printable by any three-dimensional printer of the plurality of three-dimensional printers;
    a print evaluator, executed by the at least one hardware processor, to
        ascertain, based on a determination that the three-dimensional part is printable by the at least one three-dimensional printer of the plurality of three-dimensional printers, costs associated with three-dimensional printing of the three-dimensional part and non-three-dimensional printing based manufacturing of the three-dimensional part, and
        determine, based on an analysis of the costs associated with the three-dimensional printing of the three-dimensional part and the non-three-dimensional printing based manufacturing of the three-dimensional part, whether the three-dimensional part is to be printed by the at least one three-dimensional printer of the plurality of three-dimensional printers; and
    a digital integrator, executed by the at least one hardware processor, to
        ascertain, based on a determination that the three-dimensional part is to be printed by the at least one three-dimensional printer of the plurality of three-dimensional printers, the electronic three-dimensional printing file for the three-dimensional part to be printed,
        control, by a distributed electronic ledger, execution of the electronic three-dimensional printing file for the three-dimensional part to be printed, and
        control, by the distributed electronic ledger and based on the execution of the electronic three-dimensional printing file for the three-dimensional part to be printed, printing of the three-dimensional part.

2. The system according to claim 1, wherein the printability analyzer is to ascertain the plurality of attributes that include a design attribute, a material attribute, and a dimension attribute, and wherein the printability analyzer is to compare the three-dimensional printing constraints from the electronic three-dimensional printing file for the three-dimensional part to be printed to each attribute of the plurality of attributes for each three-dimensional printer of the plurality of three-dimensional printers by comparing the design attribute to the design constraint,
comparing the material attribute to the material constraint, and
comparing the dimension attribute to the dimension constraint.

3. The system according to claim 2, wherein the printability analyzer is to determine, based on the comparison, whether the three-dimensional part is printable by the at least one three-dimensional printer of the plurality of three-dimensional printers or not printable by any three-dimensional printer of the plurality of three-dimensional printers by determining whether the design attribute meets or exceeds the design constraint,
determining whether the material attribute meets or exceeds the material constraint, and
determining whether the dimension attribute meets or exceeds the dimension constraint.

4. The system according to claim 1, wherein based on a determination that the three-dimensional part is not printable by any three-dimensional printer of the plurality of three-dimensional printers, the printability analyzer is to determine whether the design constraint or the material constraint of the three-dimensional part to be printed is not respectively met by a design attribute or a material attribute of any three-dimensional printer of the plurality of three-dimensional printers,
based on a determination that the design constraint of the three-dimensional part to be printed is not met by the design attribute of any three-dimensional printer of the plurality of three-dimensional printers, specify a redesign for the three-dimensional part to be printed to meet the design attribute of at least one three-dimensional printer of the plurality of three-dimensional printers, and
based on a determination that the material constraint of the three-dimensional part to be printed is not met by the material attribute of any three-dimensional printer of the plurality of three-dimensional printers, specify an alternate material for the three-dimensional part to be printed to meet the material attribute of at least one three-dimensional printer of the plurality of three-dimensional printers.

5. The system according to claim 1, wherein the print evaluator is to determine, based on the analysis of the costs associated with three-dimensional printing of the three-dimensional part and the non-three-dimensional printing based manufacturing of the three-dimensional part, whether the three-dimensional part is to be printed by the at least one three-dimensional printer of the plurality of three-dimensional printers by determining whether a cost associated with three-dimensional printing of the three-dimensional part is lower than a cost associated with the non-three-dimensional printing based manufacturing of the three-dimensional part, and
based on a determination that the cost associated with three-dimensional printing of the three-dimensional part is lower than the cost associated with the non-three-dimensional printing based manufacturing of the three-dimensional part, determining that the three-dimensional part is to be printed by the at least one three-dimensional printer of the plurality of three-dimensional printers.

6. The system according to claim 1, wherein the distributed electronic ledger includes a blockchain network.

7. The system according to claim 1, wherein the digital integrator is to control, by the distributed electronic ledger, execution of the electronic three-dimensional printing file for the three-dimensional part to be printed by ascertaining an authorization to execute the electronic three-dimensional printing file for the three-dimensional part to be printed,
determining, based on the ascertained authorization, whether an entity associated with the at least one three-dimensional printer of the plurality of three-dimensional printers is authorized to execute the electronic three-dimensional printing file for the three-dimensional part to be printed, and
based on a determination that the entity associated with the at least one three-dimensional printer of the plurality of three-dimensional printers is authorized to execute the electronic three-dimensional printing file for the three-dimensional part to be printed, causing the electronic three-dimensional printing file to be executed to print the three-dimensional part.

8. The system according to claim 1, wherein the digital integrator is to control, by the distributed electronic ledger, execution of the electronic three-dimensional printing file for the three-dimensional part to be printed by ascertaining a material that is available for printing of the three-dimensional part,
determining, based on the ascertained material that is available for printing of the three-dimensional part, whether an entity associated with the at least one three-dimensional printer of the plurality of three-dimensional printers has access to the material that is available for printing of the three-dimensional part, and
based on a determination that the entity associated with the at least one three-dimensional printer of the plurality of three-dimensional printers has access to the material that is available for printing of the three-dimensional part, causing the electronic three-dimensional printing file to be executed to print the three-dimensional part.

9. The system according to claim 1, wherein the digital integrator is to further control, by the distributed electronic ledger and based on the execution of the electronic three-dimensional printing file for the three-dimensional part to be printed, payment to an owner of the electronic three-dimensional printing file by determining, by the distributed electronic ledger, that the electronic three-dimensional printing file has been executed, and
based on a determination, by the distributed electronic ledger, that the electronic three-dimensional printing file has been executed, causing, by the distributed electronic ledger, transfer of the payment to the owner of the electronic three-dimensional printing file.

10. The system according to claim 1, wherein the digital integrator is to further control, by the distributed electronic ledger and based on the printing of the three-dimensional part, transfer of the three-dimensional part to a user by determining, by the distributed electronic ledger, that the three-dimensional part has been printed, and
based on a determination, by the distributed electronic ledger, that the three-dimensional part has been printed, causing, by the distributed electronic ledger, transfer of the three-dimensional part to the user.

11. A computer implemented method comprising:

ascertaining, from an electronic stereolithography file for a three-dimensional part to be printed, three-dimensional printing constraints that include a design constraint, a material constraint, and a dimension constraint;

ascertaining a plurality of attributes for each three-dimensional printer of a plurality of three-dimensional printers;

comparing the three-dimensional printing constraints from the electronic stereolithography file for the three-dimensional part to be printed to each attribute of the plurality of attributes for each three-dimensional printer of the plurality of three-dimensional printers;

determining, based on the comparison, whether the three-dimensional part is printable by at least one three-dimensional printer of the plurality of three-dimensional printers or not printable by any three-dimensional printer of the plurality of three-dimensional printers;

ascertaining, based on a determination that the three-dimensional part is printable by the at least one three-dimensional printer of the plurality of three-dimensional printers, costs associated with three-dimensional printing of the three-dimensional part and non-three-dimensional printing based manufacturing of the three-dimensional part;

determining, based on an analysis of the costs associated with the three-dimensional printing of the three-dimensional part and the non-three-dimensional printing based manufacturing of the three-dimensional part, whether the three-dimensional part is to be printed by the at least one three-dimensional printer of the plurality of three-dimensional printers;

ascertaining, based on a determination that the three-dimensional part is to be printed by the at least one three-dimensional printer of the plurality of three-dimensional printers, the electronic stereolithography file for the three-dimensional part to be printed;

controlling, by a blockchain network, execution of the electronic stereolithography file for the three-dimensional part to be printed; and controlling, by the blockchain network and based on the execution of the electronic stereolithography file for the three-dimensional part to be printed, printing of the three-dimensional part.

12. The method according to claim 11, wherein the plurality of attributes include a design attribute, a material attribute, and a dimension attribute, and wherein comparing the three-dimensional printing constraints from the electronic stereolithography file for the three-dimensional part to be printed to each attribute of the plurality of attributes for each three-dimensional printer of the plurality of three-dimensional printers further comprises:

comparing the design attribute to the design constraint;
comparing the material attribute to the material constraint; and
comparing the dimension attribute to the dimension constraint.

13. The method according to claim 12, wherein determining, based on the comparison, whether the three-dimensional part is printable by the at least one three-dimensional printer of the plurality of three-dimensional printers or not printable by any three-dimensional printer of the plurality of three-dimensional printers further comprises:

determining whether the design attribute meets or exceeds the design constraint;
determining whether the material attribute meets or exceeds the material constraint; and
determining whether the dimension attribute meets or exceeds the dimension constraint.

14. The method according to claim 11, further comprising:

based on a determination that the three-dimensional part is not printable by any three-dimensional printer of the plurality of three-dimensional printers, determining whether the design constraint or the material constraint of the three-dimensional part to be printed is not respectively met by a design attribute or a material attribute of any three-dimensional printer of the plurality of three-dimensional printers;

based on a determination that the design constraint of the three-dimensional part to be printed is not met by the design attribute of any three-dimensional printer of the plurality of three-dimensional printers, specifying a redesign for the three-dimensional part to be printed to meet the design attribute of at least one three-dimensional printer of the plurality of three-dimensional printers; and based on a determination that the material constraint of the three-dimensional part to be printed is not met by the material attribute of any three-dimensional printer of the plurality of three-dimensional printers, specifying an alternate material for the three-dimensional part to be printed to meet the material attribute of at least one three-dimensional printer of the plurality of three-dimensional printers.

15. The method according to claim 11, wherein determining, based on the analysis of the costs associated with the three-dimensional printing of the three-dimensional part and the non-three-dimensional printing based manufacturing of the three-dimensional part, whether the three-dimensional part is to be printed by the at least one three-dimensional printer of the plurality of three-dimensional printers further comprises:

determining whether a cost associated with three-dimensional printing of the three-dimensional part is lower than a cost associated with the non-three-dimensional printing based manufacturing of the three-dimensional part; and based on a determination that the cost associated with three-dimensional printing of the three-dimensional part is lower than the cost associated with the non-three-dimensional printing based manufacturing of the three-dimensional part, determining that the three-dimensional part is to be printed by the at least one three-dimensional printer of the plurality of three-dimensional printers.

16. A non-transitory computer readable medium having stored thereon machine readable instructions, the machine readable instructions, when executed, cause at least one hardware processor to:

ascertain, for a three-dimensional part to be printed, three-dimensional printing constraints;

ascertain a plurality of attributes for each three-dimensional printer of a plurality of three-dimensional printers;

compare the three-dimensional printing constraints to each attribute of the plurality of attributes for each three-dimensional printer of the plurality of three-dimensional printers;

determine, based on the comparison, whether the three-dimensional part is printable by at least one three-dimensional printer of the plurality of three-dimensional printers or not printable by any three-dimensional printer of the plurality of three-dimensional printers;

ascertain, based on a determination that the three-dimensional part is printable by the at least one three-dimensional printer of the plurality of three-dimensional printers, costs associated with three-dimensional printing of the three-dimensional non-three-dimensional printing based manufacturing of the three-dimensional part;

determine, based on an analysis of the costs associated with the three-dimensional printing of the three-dimensional part and the non-three-dimensional printing based manufacturing of the three-dimensional part, whether the three-dimensional part is to be printed by the at least one three-dimensional printer of the plurality of three-dimensional printers;

ascertain, based on a determination that the three-dimensional part is to be printed by the at least one three-dimensional printer of the plurality of three-dimensional printers, an electronic three-dimensional printing file for the three-dimensional part to be printed;

control, by a distributed electronic ledger, execution of the electronic three-dimensional printing file for the three-dimensional part to be printed; and control, by the distributed electronic ledger and based on the execution of the electronic three-dimensional printing file for the three-dimensional part to be printed, printing of the three-dimensional part.

17. The non-transitory computer readable medium according to claim 16, wherein the machine readable instructions to control, by the distributed electronic ledger, execution of the electronic three-dimensional printing file for the three-dimensional part to be printed, when executed by the at least one hardware processor, further cause the at least one hardware processor to:

ascertain an authorization to execute the electronic three-dimensional printing file for the three-dimensional part to be printed;

determine, based on the ascertained authorization, whether an entity associated with the at least one three-dimensional printer of the plurality of three-dimensional printers is authorized to execute the electronic three-dimensional printing file for the three-dimensional part to be printed; and based on a determination that the entity associated with the at least one three-dimensional printer of the plurality of three-dimensional printers is authorized to execute the electronic three-dimensional printing file for the three-dimensional part to be printed, cause the electronic three-dimensional printing file to be executed to print the three-dimensional part.

18. The non-transitory computer readable medium according to claim 16, wherein the machine readable instructions to control, by the distributed electronic ledger, execution of the electronic three-dimensional printing file for the three-dimensional part to be printed, when executed by the at least one hardware processor further cause the at least one hardware processor to:

ascertain a material that is available for printing of the three-dimensional part;

determine, based on the ascertained material that is available for printing of the three-dimensional part, whether an entity associated with the at least one three-dimensional printer of the plurality of three-dimensional printers has access to the material that is available for printing of the three-dimensional part; and based on a determination that the entity associated with the at least one three-dimensional printer of the plurality of three-dimensional printers has access to the material that is available for printing of the three-dimensional part, cause the electronic three-dimensional printing file to be executed to print the three-dimensional part.

19. The non-transitory computer readable medium according to claim 16, wherein the machine readable instructions when executed by the at least one hardware processor further cause the at least one hardware processor to:

control, by the distributed electronic ledger and based on the execution of the electronic three-dimensional printing file for the three-dimensional part to be printed, payment to an owner of the electronic three-dimensional printing file by determining, by the distributed electronic ledger, that the electronic three-dimensional printing file has been executed, and based on a determination, by the distributed electronic ledger, that the electronic three-dimensional printing file has been executed, causing, by the distributed electronic ledger, transfer of the payment to the owner of the electronic three-dimensional printing file.

20. The non-transitory computer readable medium according to claim 16, wherein the machine readable instructions when executed by the at least one hardware processor further cause the at least one hardware processor to:

control, by the distributed electronic ledger and based on the printing of the three-dimensional part, transfer of the three-dimensional part to a user by determining, by the distributed electronic ledger, that the three-dimensional part has been printed; and based on a determination, by the distributed electronic ledger, that the three-dimensional part has been printed, causing, by the distributed electronic ledger, transfer of the three-dimensional part to the user.

* * * * *